(12) United States Patent
Mizutani et al.

(10) Patent No.: US 9,035,645 B2
(45) Date of Patent: May 19, 2015

(54) POSITION DETECTING DEVICE

(71) Applicant: DENSO CORPORATION, Kariya, Aichi-pref. (JP)

(72) Inventors: Akitoshi Mizutani, Okazaki (JP); Naoaki Kouno, Chiryu (JP)

(73) Assignee: DENSO CORPORATION, Kariya (JP)

( * ) Notice: Subject to any disclaimer, the term of this patent is extended or adjusted under 35 U.S.C. 154(b) by 259 days.

(21) Appl. No.: 13/663,789

(22) Filed: Oct. 30, 2012

(65) Prior Publication Data

US 2013/0106404 A1 May 2, 2013

(30) Foreign Application Priority Data

Nov. 1, 2011 (JP) ................................ 2011-240109

(51) Int. Cl.
*G01R 33/06* (2006.01)
*G01B 7/14* (2006.01)
*G01B 7/00* (2006.01)

(52) U.S. Cl.
CPC ...................................... *G01B 7/003* (2013.01)

(58) Field of Classification Search
None
See application file for complete search history.

(56) References Cited

U.S. PATENT DOCUMENTS

| 4,678,951 A * | 7/1987 | Nikaido ........................... 310/13 |
| 2003/0122641 A1 | 7/2003 | Luetzow |
| 2010/0188074 A1 | 7/2010 | Matsumoto et al. |
| 2011/0248705 A1 * | 10/2011 | Matsumoto et al. ....... 324/207.2 |

FOREIGN PATENT DOCUMENTS

| JP | 7-103707 | 4/1995 |
| JP | 2007-132710 | 5/2007 |
| JP | 2010-197373 | 9/2010 |

* cited by examiner

*Primary Examiner* — Melissa Koval
*Assistant Examiner* — Courtney McDonnough
(74) *Attorney, Agent, or Firm* — Nixon & Vanderhye P.C.

(57) ABSTRACT

A first and a second magnet are provided on a movable member so as to oppose to each other across a virtual plane. Each magnet is magnetized in a direction perpendicular to the movable member, so that the same magnetic poles of the magnets are opposed to each other. A hall IC is provided at a position more remote from the movable member than the magnets so as to be movable on the virtual plane relative to the movable member. A Y-parallel area is formed in a space equally distanced from the first and the second magnets, in which magnetic fields of the first and the second magnet rebel against each other, so that directions of the magnetic fields are so made to be in parallel to a stroke direction of the movable member. Robustness for a position gap between the magnets and the hall IC is improved.

19 Claims, 26 Drawing Sheets

POSITION DETECTING DEVICE

CROSS REFERENCE TO RELATED APPLICATION

This application is based on Japanese Patent Application No. 2011-240109 filed on Nov. 1, 2011, the disclosure of which is incorporated herein by reference.

TECHNICAL FIELD

The present disclosure relates to a position detecting device for detecting a position of a movable member.

BACKGROUND

A position detecting device is known in the art, for example, as disclosed in Japanese Patent Publication No. 2007-132710. The position detecting device has a magnet provided in a movable member with a rectilinear travel and a magnetic detecting element movable relative to the magnet. The position detecting device detects a position of the movable member based on a signal outputted from the magnetic detecting element.

As shown in FIGS. 29A and 29B attached to the present application, the position detecting device of the above prior art (JP 2007-132710), has a magnet 100 and a magnetic detecting element 101 provided at a location separated from the magnet 100 in a magnetizing direction of the magnet 100. As indicated by dotted lines in FIGS. 29A and 29B, magnetic field of the magnet 100 is formed in a radial fashion. In a case an attachment position of the magnet 100 and/or the magnetic detecting element 101 is displaced, for example due to manufacturing tolerance, in a direction "X" perpendicular to a direction "Y" (a stroke direction) in which the magnet 100 moves, output characteristics of the magnetic detecting element 101 may be largely changed. This may cause a decrease of detection accuracy of the position detecting device.

SUMMARY OF THE DISCLOSURE

The present disclosure is made in view of the above problem. It is an object of the present disclosure to provide a position detecting device, according to which robustness for a position gap between a magnetic-flux generating member (such as, a magnet) and a magnetic detecting member (for example, a hall element) is optimized.

According to a feature of the present disclosure, a position detecting device detects a position of a movable member movable in a linear stroke direction. The position detecting device has a first magnetic-flux generating member and a second magnetic-flux generating member, wherein the first and the second magnetic-flux generating members are provided on the movable member so as to oppose to each other across a virtual plane which is in parallel to the linear stroke direction and perpendicular to the movable member. The first and the second magnetic-flux generating members are magnetized in the same direction to each other which is perpendicular to the movable member.

The position detecting device further has a magnetic detecting member provided at a position more remote from the movable member than the first and the second magnetic-flux generating members in a direction perpendicular to the movable member, so as to be movable relative to the movable member in the linear stroke direction, wherein the magnetic detecting member has a magnetic sensing surface arranged so as to be perpendicular to the linear stroke direction, and the magnetic detecting member outputs a signal depending on density of magnetic flux passing through the magnetic sensing surface.

According to the above feature, a magnetic field of the first magnetic-flux generating member and a magnetic field of the second magnetic-flux generating member rebel against each other. Such an area (a Y-parallel area) is formed in a space more remote from the movable member than the first and second magnetic-flux generating members, in which directions of the magnetic fields are in parallel to the linear stroke direction, when viewed in a direction perpendicular to the movable member. The magnetic detecting member is provided in the above area (the Y-parallel area). Even when the magnetic detecting member is displaced, for example, due to manufacturing tolerance, in a direction perpendicular to the linear stroke direction, variation of output characteristic of the magnetic detecting member can be suppressed. As a result, robustness of the position detecting device can be increased with respect to a position gap between the magnetic-flux generating member and the magnetic detecting member.

In addition, in each of the first and second magnetic-flux generating members, one of magnetic poles (N-pole or S-pole) is formed at a side remote from the movable member. Furthermore, the magnetic detecting member is located at such a position, which is more remote from the movable member than the first and the second magnetic-flux generating members. Therefore, even when the movable member is made of magnetic material, it is possible to suppress such a situation that the magnetic fields of the first and the second magnetic-flux generating members are pulled into the movable member. Instead, magnetic field strength can be increased in the area surrounding the magnetic detecting member. As a result, density of the magnetic flux passing through a magnetic sensing surface of the magnetic detecting member is increased. This means that an S/R ratio (that is, a signal-to-noise ratio) is increased, to thereby increase the robustness for the position detecting device with respect to disturbance. Detecting accuracy can be thus increased.

According to another feature of the present disclosure, a position detecting device detects a position of a movable member movable in a linear stroke direction.

The position detecting device has a first magnetic-flux generating member and a second magnetic-flux generating member, wherein the first and the second magnetic-flux generating members are provided on the movable member so as to oppose to each other across a virtual plane which is in parallel to the linear stroke direction and perpendicular to the movable member, and wherein the first and the second magnetic-flux generating members are magnetized in the same direction to each other which is perpendicular to the movable member.

The position detecting device further has a third magnetic-flux generating member provided at a position remote from the first magnetic-flux generating member by a predetermined distance in the stroke direction and a fourth magnetic-flux generating member provided at another position remote from the second magnetic-flux generating member by a predetermined distance in the stroke direction, wherein the third and the fourth magnetic-flux generating members are magnetized in the same direction to that of the first and the second magnetic-flux generating members.

In the position detecting device, a magnetic detecting member is provided at a position more remote from the movable member than the first to the fourth magnetic-flux generating members in a direction perpendicular to the movable member, so as to be movable relative to the movable member in the linear stroke direction, wherein the magnetic detecting member has a magnetic sensing surface arranged so as to be perpendicular to the linear stroke direction, and the magnetic detecting member outputs a signal depending on density of magnetic flux passing through the magnetic sensing surface.

According to the above feature, it is possible to locate multiple magnetic-flux generating members at both sides of a stroke detecting range. A total volume of the magnetic-flux generating members can be reduced, to thereby reduce manufacturing cost of the position detecting device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
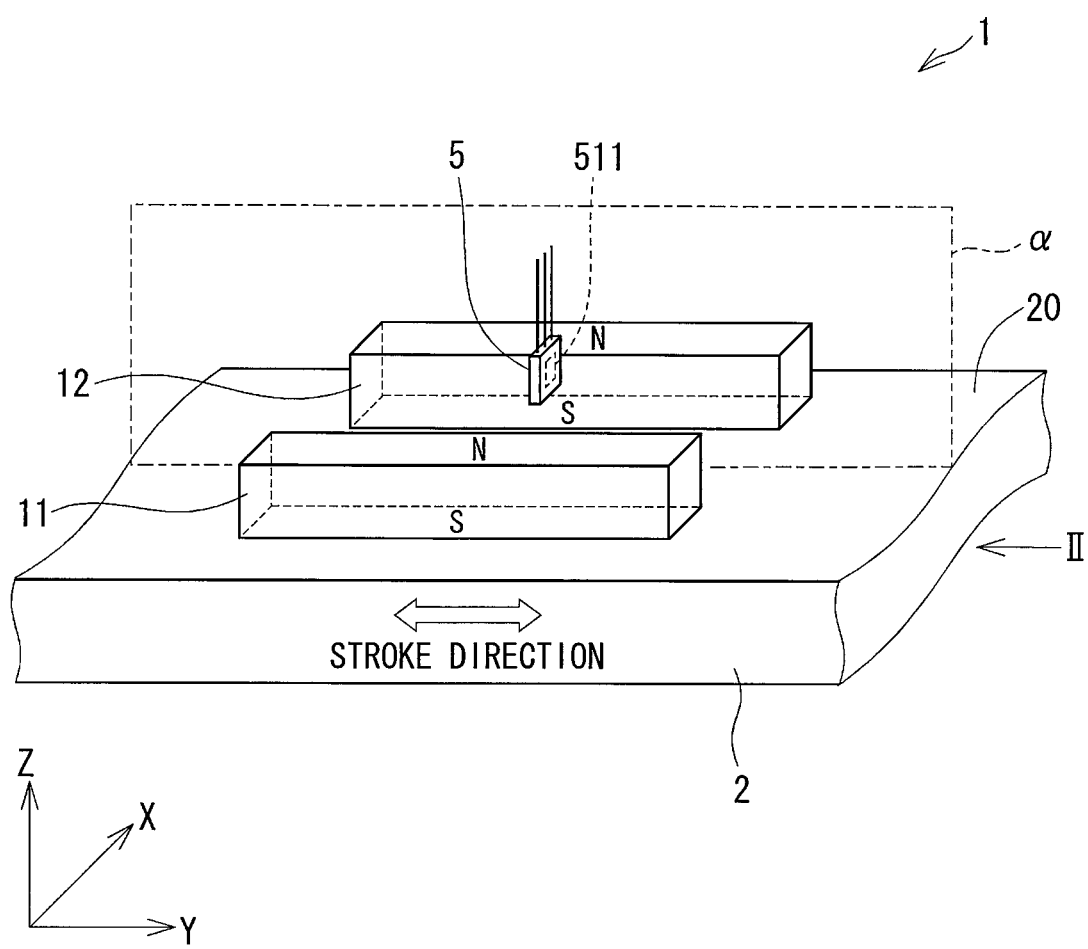
FIG. 1 is a schematic perspective view showing a position detecting device according to a first embodiment of the present disclosure.

The present disclosure will be explained by way of multiple embodiments with reference to the drawings. The same reference numerals are used throughout the embodiments for the purpose of designating the same or similar parts and components.

(First Embodiment)

Figure 2:
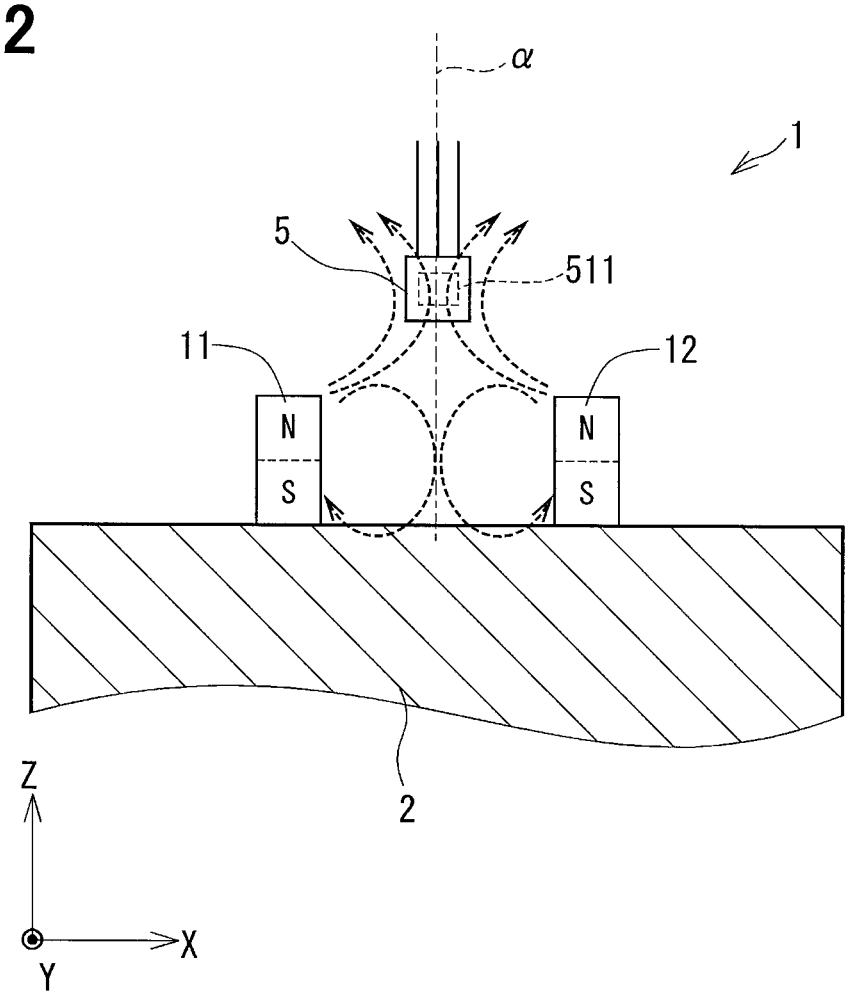
FIG. 2 is a schematic side view in a direction of an arrow II in FIG. 1.
Figure 3:
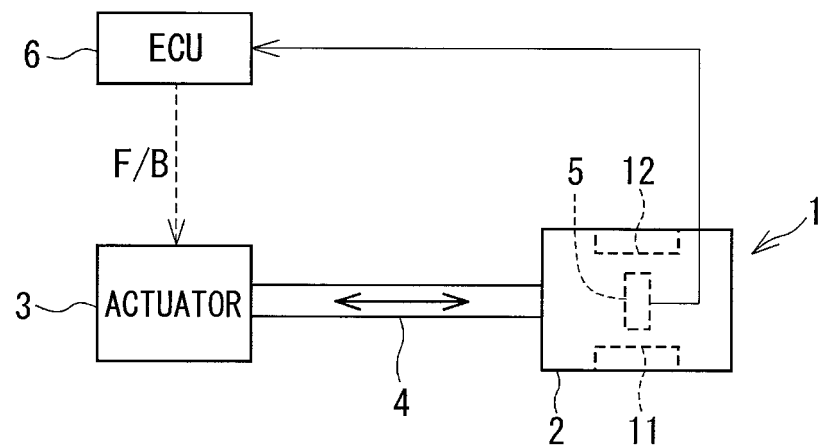
FIG. 3 is a schematic system structure, to which the position detecting device of the present disclosure is applied.

A position detecting device 1 of a first embodiment of the present disclosure will be explained with reference to FIGS. 1 to 7. The position detecting device 1 is applied to a stroke detecting portion for a transmission apparatus, an acceleration pedal, a brake pedal for a vehicle, so as to detect a position of a movable member thereof. One of examples is shown in FIG. 3. In FIG. 3, a movable member 2 is connected to a stroke portion 4 of an actuator (linear actuator) 3 and movable in a linear direction (a stroke direction) as indicated by an arrow in the drawing. A first magnet 11 (a first magnetic-field generating member) and a second magnet 12 (a second magnetic-field generating member) are provided in the movable member 2.

A hall IC 5 (a magnetic detecting member) is provided in the position detecting device 1 in such a way that the hall IC 5 moves relative to the movable member 2. The hall IC 5 outputs a signal depending on density of magnetic flux passing through a magnetic sensing surface. The signal of the hall IC 5 is outputted to an ECU (Electronic Control Unit) 6. The ECU 6 feed-back controls the linear actuator 3 based on the signal from the hall IC 5.

The position detecting device 1 will be further explained with reference to FIGS. 1 and 2.

The movable member 2, which moves linearly in the stroke direction, is made of magnetic material. Each of the first and second magnets 11 and 12 has the same magnetic characteristic to each other and formed in the same rectangular parallelepiped shape. A virtual plane "α", which is indicated by a one-dot-chain line in FIG. 1, is in parallel to the stroke direction in which the movable member 2 moves and perpendicular to a magnet attachment surface 20 of the movable member 2. The first and the second magnets 11 and 12 are provided so as to oppose to each other across the virtual plane "α" and a longitudinal direction of each magnet 11, 12 (of the rectangular parallelepiped shape) is in parallel to the stroke direction.

In the drawings, a direction in which the magnets 11 and 12 are opposed to each other is defined as an X-axis, the stroke direction is defined as a Y-axis, and a direction perpendicular to the X-axis and the Y-axis is defined as a Z-axis.

Each of the magnets 11 and 12 is magnetized in a direction of the Z-axis, so that S-pole is formed at a side to the movable member 2 (a lower side in the drawings), while N-pole is formed at a side opposite to the movable member 2 (an upper side in the drawings).

The virtual plane "α" is equally distanced from the first and the second magnets 11 and 12 in the direction of the X-axis.

The hall IC 5 is an electronic component, in which a hall element and an electronic circuit are integrally formed in a semiconductor chip. The hall IC 5 is arranged, in the direction of the Z-axis, at a position more remote from the movable member 2 than the first and the second magnets 11 and 12. The hall IC 5 is so arranged that a magnetic sensing surface 511 of the hall element is perpendicular to the direction of the Y-axis. The hall IC 5 moves relative to the movable member 2 on the virtual plane "α", which is located in a position with the same distances to the first and the second magnets 11 and 12.

Figure 4A:
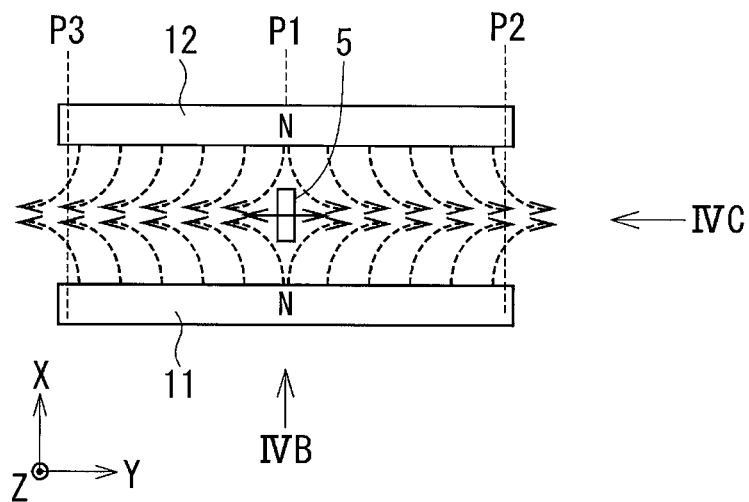
FIG. 4A is a schematic view showing direction of magnetic field of the position detecting device according to the first embodiment.
Figure 4B:
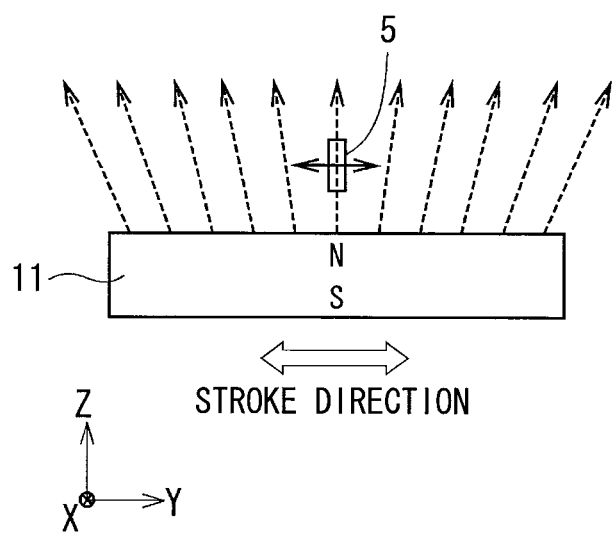
FIG. 4B is a schematic side view in a direction of an arrow IVB in FIG. 4A

Direction of magnetic field for the magnets 11 and 12 will be explained with reference to FIGS. 4A to 4C. As shown in FIGS. 4A and 4B, a magnetic field of the N-pole of the first magnet 11 and a magnetic field of the N-pole of the second magnet 12 rebel against each other. Such an area is formed in a space more remote, in the direction of the Z-axis, from the movable member 2 than the first and second magnets 11 and 12, in which directions of the magnetic fields are in parallel to the Y-axis, when viewed in the direction of the Z-axis. The area is hereinafter called as a Y-parallel area.

Figure 4C:
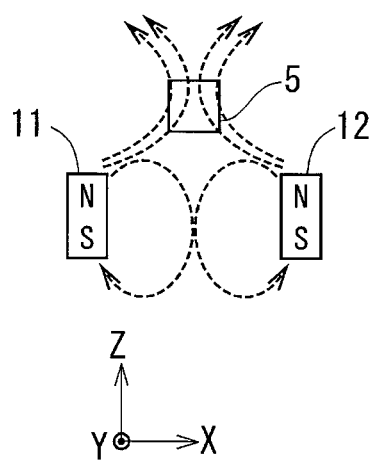
FIG. 4C is a schematic side view in a direction of an arrow IVC in FIG. 4A.

Since the N-pole of the first magnet 11 as well as the N-pole of the second magnet 12 is formed at a position remote from the movable member 2 in the direction of the Z-axis, it is suppressed that the magnetic field from the first magnet 11 as well as the magnetic field from the second magnet 12 is pulled into the movable member 2, as shown in FIG. 4C. Instead, magnetic field strength is increased in the above area (the Y-parallel area), which is more remote from the movable member 2 than the first and the second magnets 11 and 12, in the direction of the Z-axis.

Figure 5:
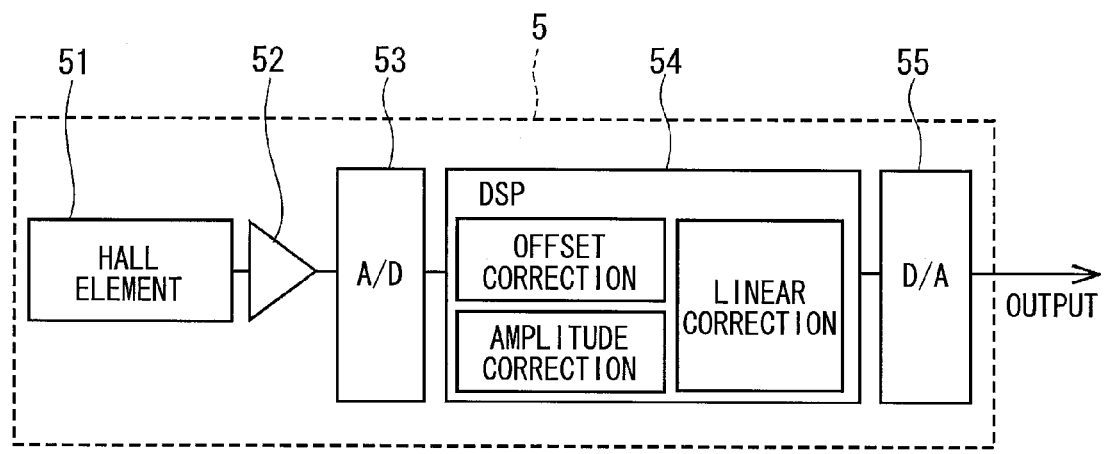
FIG. 5 is a block diagram showing a circuit for a hall IC of the position detecting device according to the first embodiment.

The hall IC 5 is provided in the Y-parallel area, in which the direction of the magnetic field is in parallel to the Y-axis. As shown in FIG. 5, an analog signal from a hall element 51 is amplified by an amplifying circuit 52 and then converted to a digital signal by an A/D converting circuit 53. The digital signal is processed by a DSP (Digital Signal Processor) 54 for an offset correction, an amplitude correction, a linear correction. Such corrected signal is converted to an analog value by a D/A converting circuit 55 and outputted to the ECU 6.

Figure 6:
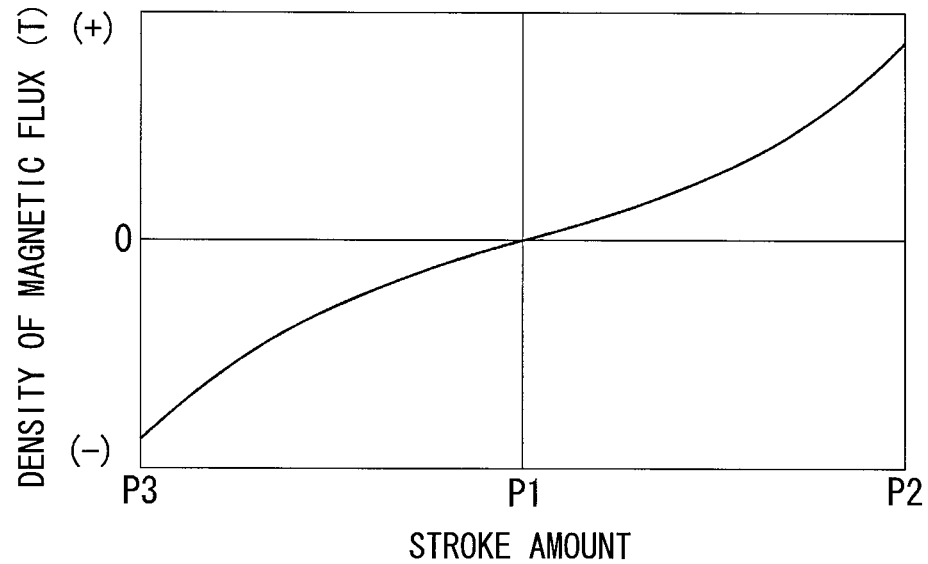
FIG. 6 is a graph showing a characteristic curve of density of magnetic flux detected by a hall element according to the first embodiment.
Figure 7:
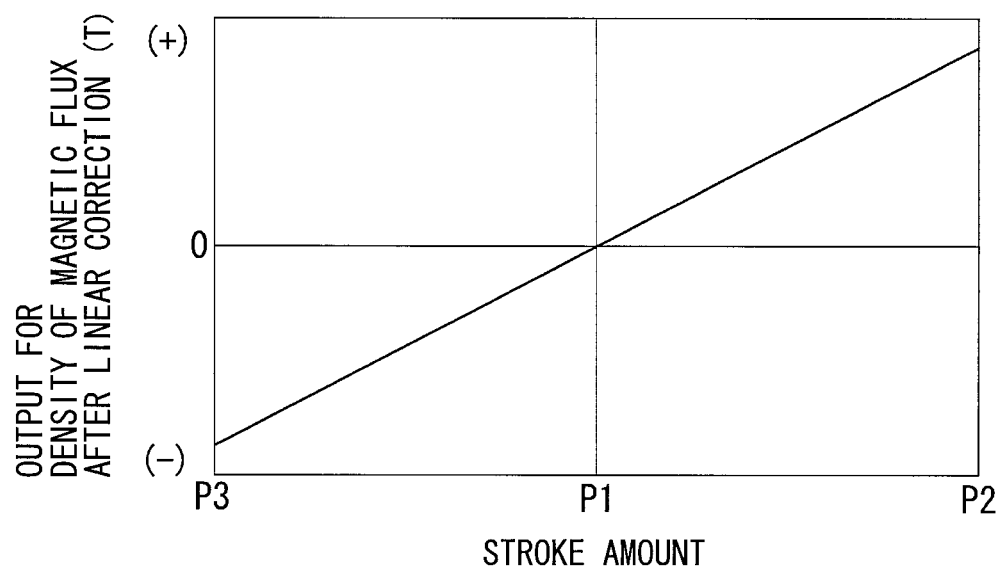
FIG. 7 is a graph showing a characteristic line after processing linear-correction for the characteristic curve of FIG. 6.
Figure 8:
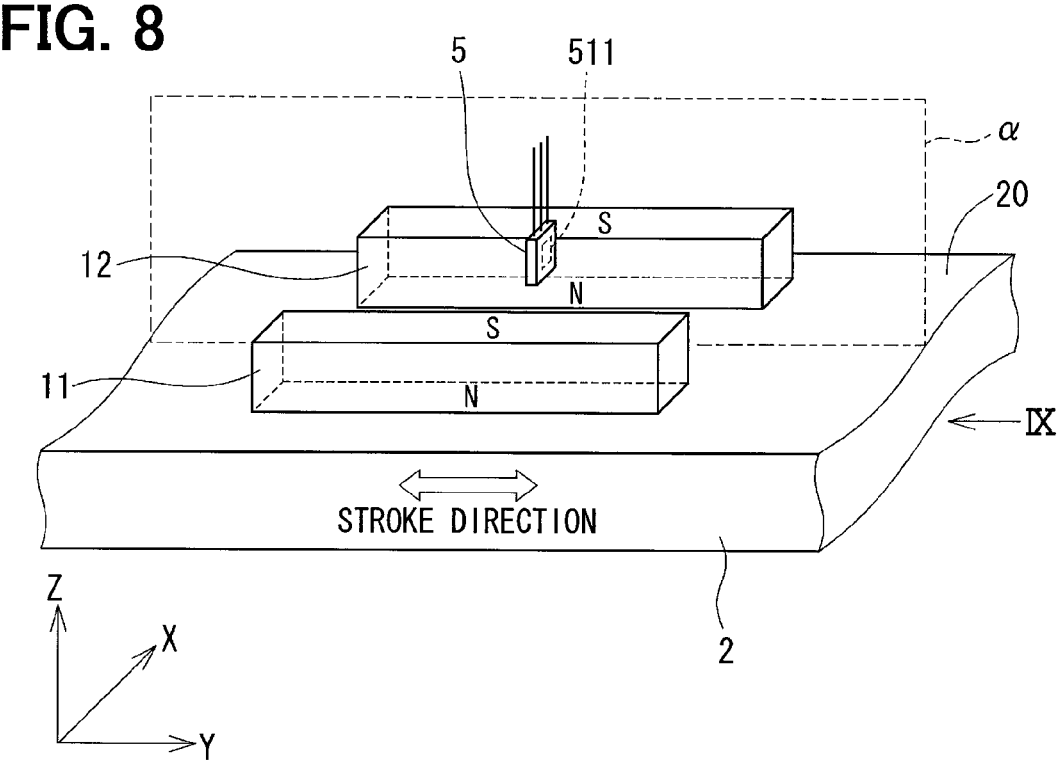
FIG. 8 is a schematic perspective view showing a position detecting device according to a second embodiment of the present disclosure.
Figure 9:
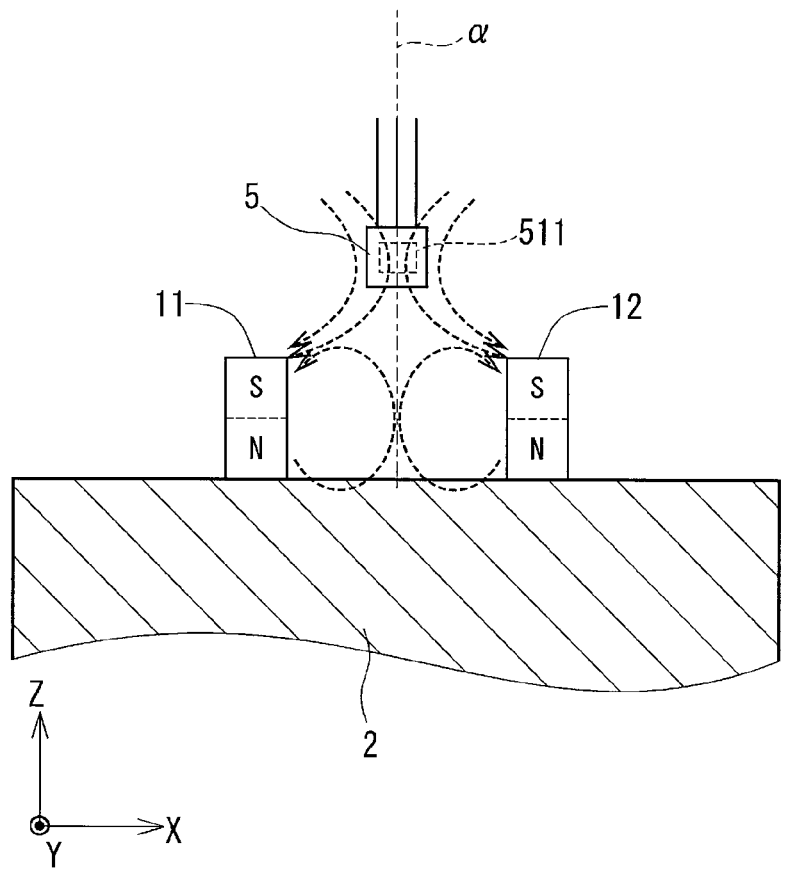
FIG. 9 is a schematic side view in a direction of an arrow IX in FIG. 8.

FIG. 6 shows an output characteristic for density of the magnetic flux, which is detected by the hall element 51. FIG. 7 shows an output characteristic of the hall element 51, which is processed for the linear correction.

As shown in FIGS. 4A, 4B, 4C, 6 and 7, density (T) of the magnetic flux passing through the magnetic sensing surface 511 of the hall element 51 becomes a minimum value (as an absolute figure) at a center position P1 in the direction of the Y-axis of the first and the second magnets 11 and 12. When a magnetic-flux vector in the direction of the Y-axis (that is, a right-hand direction in FIGS. 4A and 4B) is expressed by a positive figure (in a plus (+) side), the density (T) of the magnetic flux becomes larger in the plus (+) side as the hall element 51 moves to a right-hand position P2 of the first and the second magnets 11 and 12 relative to the movable member 2. On the other hand, the density (T) of the magnetic flux becomes larger as an absolute figure in a minus (−) side as the hall element 51 moves to a left-hand position P3 of the first and the second magnets 11 and 12 relative to the movable member 2.

In a case that the magnetic-flux vector in the direction of the Y-axis (the right-hand direction in FIGS. 4A and 4B) is expressed by a negative figure (in the minus (−) side), a gradient for the characteristic curve is respectively reversed in FIG. 6 and in FIG. 7. In other words, the density (T) of the magnetic flux becomes larger as the absolute figure in the minus (−) side as the hall element 51 moves to the right-hand position P2 of the first and the second magnets 11 and 12 relative to the movable member 2. On the other hand, the density (T) of the magnetic flux becomes larger as the absolute figure in the plus (+) side as the hall element 51 moves to the left-hand position P3 of the first and the second magnets 11 and 12 relative to the movable member 2.

The present embodiment has the following advantages:

(1) Since the hall IC 5 is provided at such a position more remote from the movable member 2, in the direction of the Z-axis, than the first and the second magnets 11 and 12, the hall IC 5 can be arranged at such an area (the Y-parallel area) in which the directions of the respective magnetic fields of the first and the second magnets 11 are parallel to the direction of the Y-axis, when viewed in the direction of the Z-axis. According to the above structure, even when the hall IC 5 was displaced, for example, due to the manufacturing tolerance in the direction of the X-axis (perpendicular to the Y-axis), a variation of the output characteristic of the hall IC 5 can be suppressed to a small value. Accordingly, the robustness of the position detecting device 1 can be increased with respect to the position gap between the hall IC 5 and the first and the second magnets 11 and 12.

(2) In addition, the N-pole of each magnet 11, 12 is formed at the position remote from the movable member 2. It is, therefore, possible to suppress such situation that the magnetic field for the N-pole is pulled into the movable member 2. Instead, the magnetic field strength can be increased in an area surrounding the hall IC 5. As a result, the density of the magnetic flux passing through the magnetic sensing surface 511 of the hall element 51 for the hall IC 5 can be increased. This means that an S/N ratio (that is, a signal-to-noise ratio) can be increased, to thereby increase the robustness for the position detecting device 1 with respect to disturbance. The detecting accuracy can be thus increased.

(3) The magnetic detecting member (the hall IC 5) moves, relative to the movable member 2, on the virtual plane "α", which is virtually formed at the position equally distanced from the first and the second magnets 11 and 12. The directions of the magnetic fields are most uniformly in parallel to the direction of the Y-axis in the area of the virtual plane. Accordingly, even when the hall IC 5 was displaced due to the manufacturing tolerance in the direction of the X-axis (perpendicular to the Y-axis), the variation of the output characteristic of the hall IC 5 can be suppressed to a small value.

(4) Each of the first and the second magnets 11 and 12 is formed in the same rectangular parallelepiped shape to each other and has the same magnetic characteristic to each other. Therefore, in the area (the Y-parallel area), in which the hall IC 5 is provided, the directions of the magnetic fields become more uniformly parallel to the direction of the Y-axis. In addition, efficiency for manufacturing process (such as, parts control, assembling process or the like) can be increased.

In addition, since the first and the second magnets 11 and 12 are formed in a simple shape, it is possible to suppress variation in a machining process and an assembling process. It is further possible to reduce manufacturing cost because of the simple geometry.

(5) In the hall IC 5, since the output of the hall element 51 is processed by the linear correction so that the output can be shaped to a straight line, it is not necessary for the hall element 51 to generate its output having a high linearity for the density of the magnetic flux. Therefore, the shape as well as location of the first and the second magnets can be made simpler.

Figure 30:
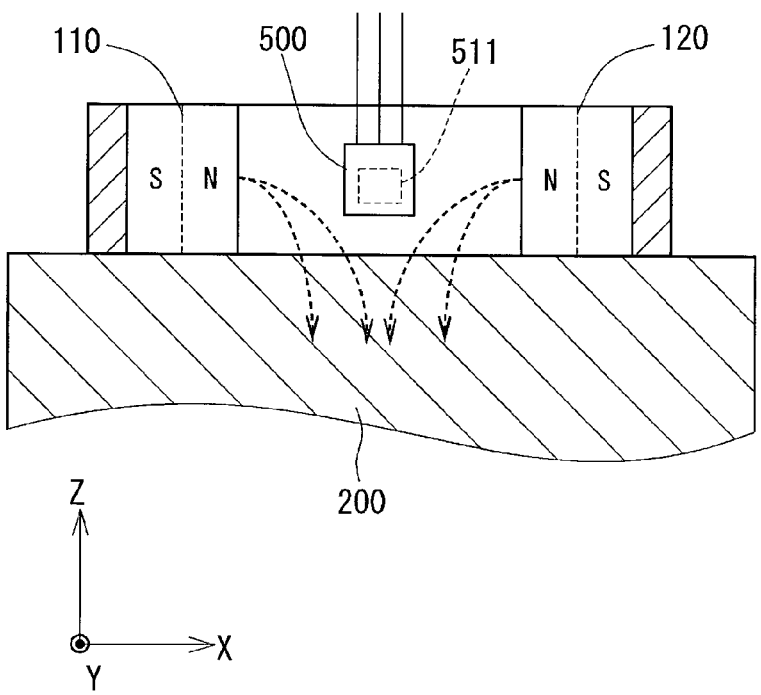
FIG. 30 is a schematic view showing direction of magnetic field of a position detecting device according to a comparison example.
Figure 31:
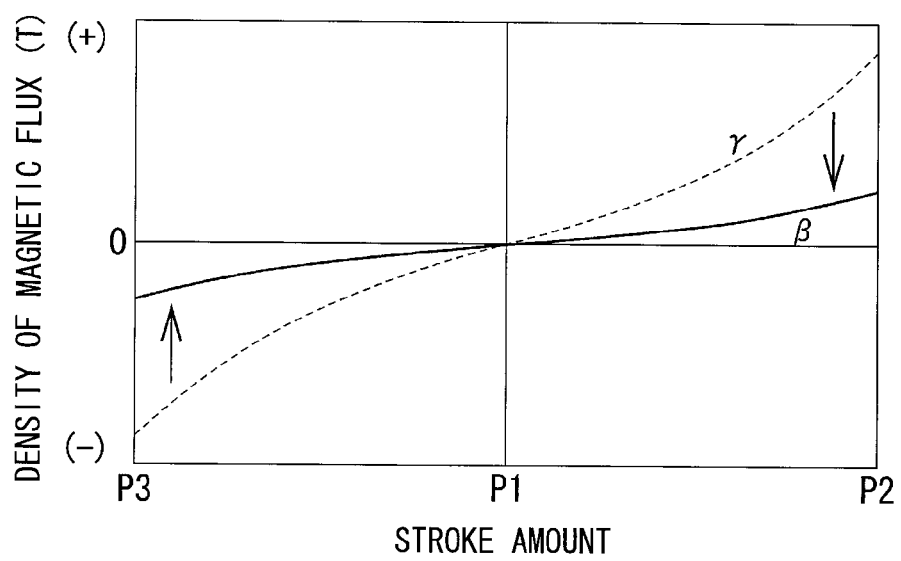
FIG. 31 is a graph showing characteristic curves of density of magnetic flux detected by a hall element according to the comparison example.

A position detecting device of a comparison example for the first embodiment will be explained with reference to FIGS. 30 and 31.

In the comparison example, each of a first magnet 110 and a second magnet 120 is magnetized in the direction of the X-axis. The first and second magnets 110 and 120 are arranged so that each N-pole is opposed to each other. A movable member 200, which is made of magnetic material, can linearly move in a stroke direction in parallel to the Y-axis (a direction perpendicular to a sheet for the drawing of FIG. 30). A hall IC 500 is provided between the first and the second magnets 110 and 120, so as to be movable relative the movable member 200 (namely relative to the magnets 110 and 120). The magnetic sensing surface 511 of the hall IC 500 is arranged so as to be perpendicular to the Y-axis.

In the comparison example, each of the N-pole and the S-pole of the first and the second magnets 110 and 120 are brought into contact with the movable member 200. As indicated by dotted lines in FIG. 30, magnetic fields of the first and the second magnets 110 and 120 are pulled toward the movable member 200. Therefore, magnetic field strength is decreased in an area surrounding the hall IC 500. A characteristic curve "β" indicated by a solid line in FIG. 31 corresponds to an output of the hall IC 500 of the comparison example, while a characteristic curve "γ" indicated by a dotted line corresponds to the output of the hall IC 5 of the first embodiment. As seen from FIG. 31, the density of the magnetic flux of the hall IC 500 of the comparison example is largely reduced when compared with that of the hall IC 5 of the first embodiment.

(Second Embodiment)

A second embodiment of the present disclosure is shown in FIGS. 8 to 11.

In the second embodiment, the N-pole of each magnet 11 and 12 is formed at the lower side of the magnet (the movable member side), while the S-pole of each magnet 11 and 12 is formed at the upper side of the magnet (opposite to the movable member side).

Figure 10A:
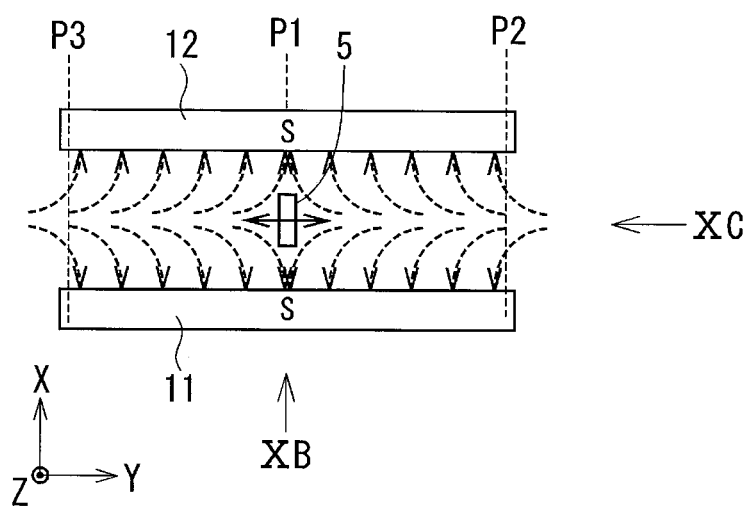
FIG. 10A is a schematic view showing direction of magnetic field of the position detecting device according to the second embodiment.
Figure 10B:
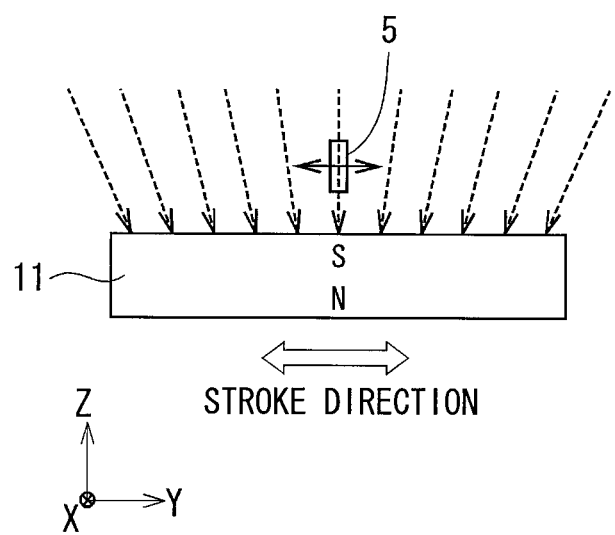
FIG. 10B is a schematic side view in a direction of an arrow XB in FIG. 10A

As shown in FIGS. 10A and 10B, a magnetic field of the S-pole of the first magnet 11 and a magnetic field of the S-pole of the second magnet 12 rebel against each other. Such an area (a Y-parallel area) is formed in a space more remote from the movable member 2 in the direction of the Z-axis than the first and second magnets 11 and 12, in which directions of the magnetic fields are in parallel to the Y-axis, when viewed in the direction of the Z-axis.

Figure 10C:
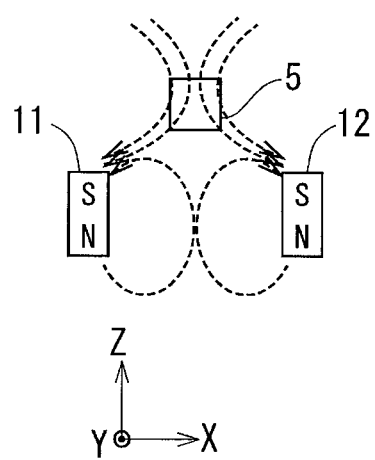
FIG. 10C is a schematic side view in a direction of an arrow XC in FIG. 10A.

Since the S-pole of the first magnet 11 as well as the S-pole of the second magnet 12 is formed at a position remote from the movable member 2 in the direction of the Z-axis, it is suppressed that the magnetic field from the first magnet 11 as well as the magnetic field from the second magnet 12 is pulled into the movable member 2, as shown in FIG. 10C. Instead, magnetic field strength is increased in the above area (the Y-parallel area), which is more remote from the movable member 2 than the first and the second magnets 11 and 12.

Figure 11:
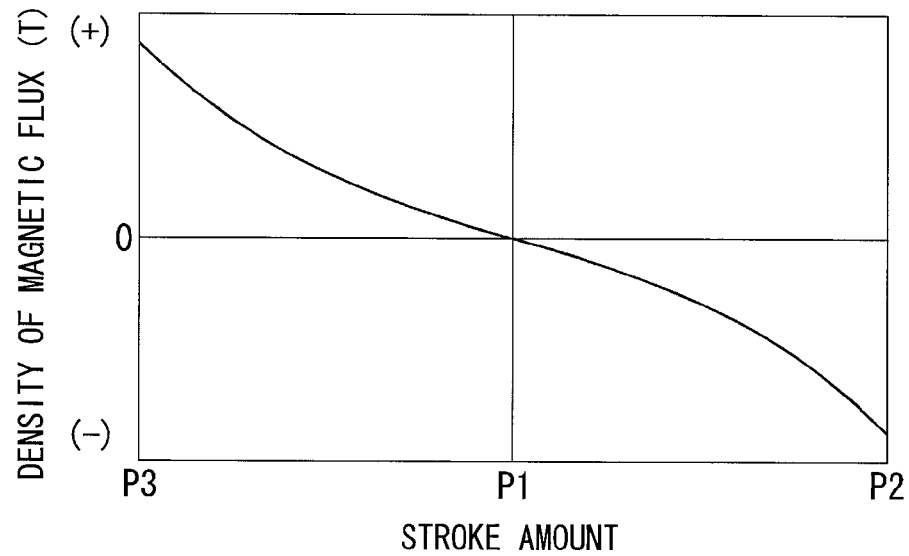
FIG. 11 is a characteristic curve of density of magnetic flux detected by a hall element according to the second embodiment.
Figure 12:
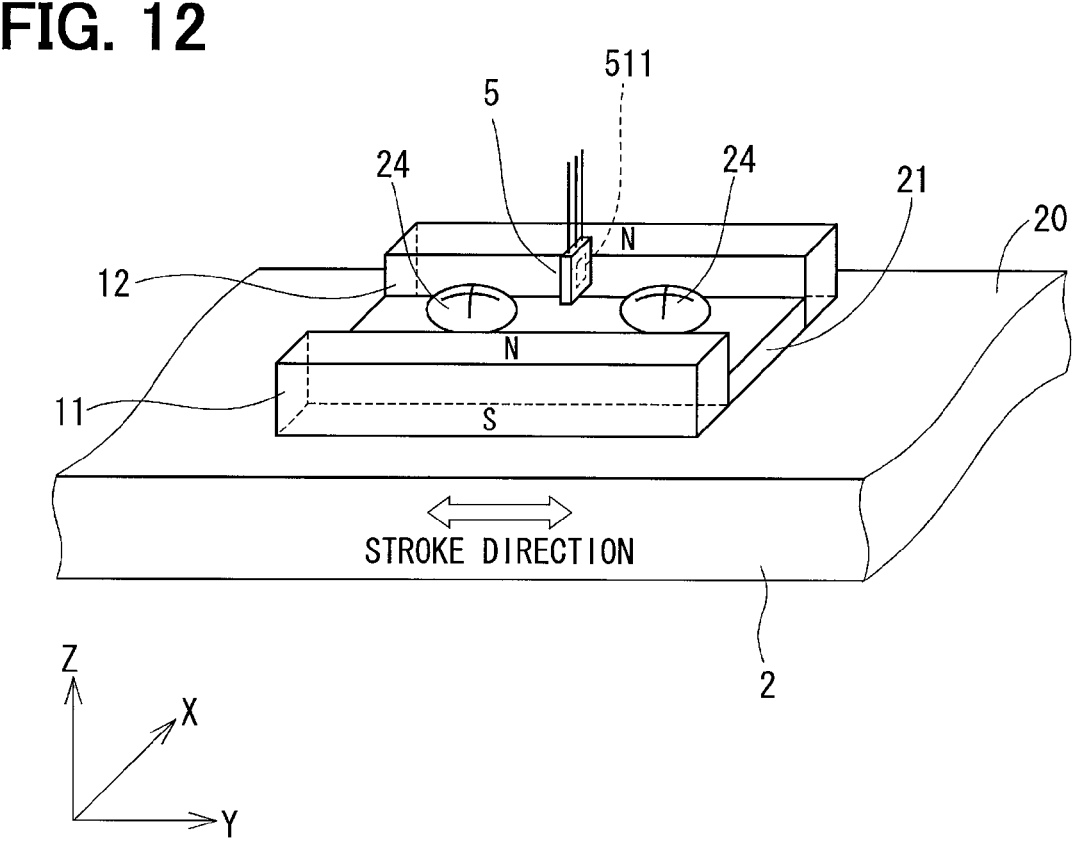
FIG. 12 is a schematic perspective view showing a position detecting device according to a third embodiment of the present disclosure.
Figure 13A:
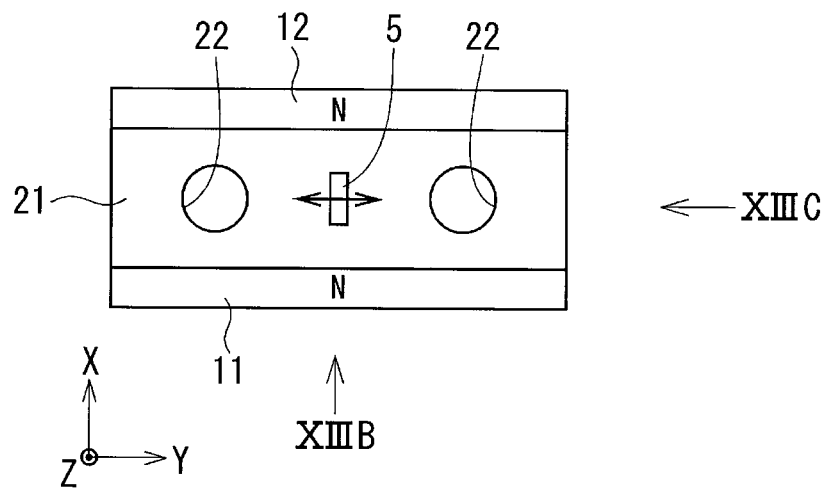
FIG. 13A is a schematic plane view showing a position detecting device according to the third embodiment.
Figure 13B:
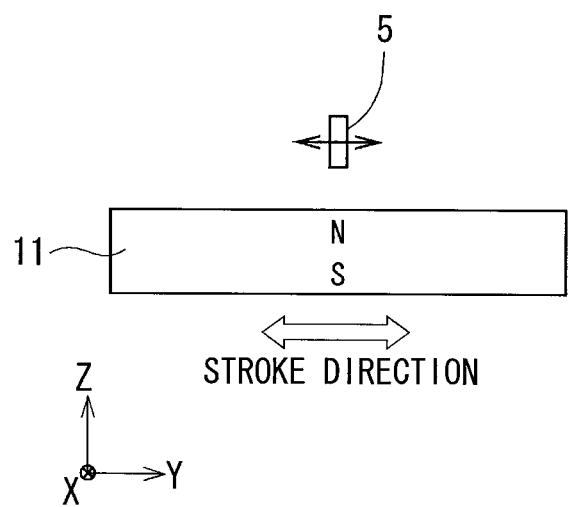
FIG. 13B is a schematic side view in a direction of an arrow XIIIB in FIG. 13A
Figure 13C:
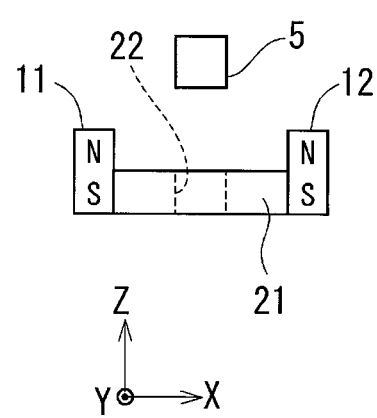
FIG. 13C is a schematic side view in a direction of an arrow XIIIC in FIG. 13A.
Figure 14A:
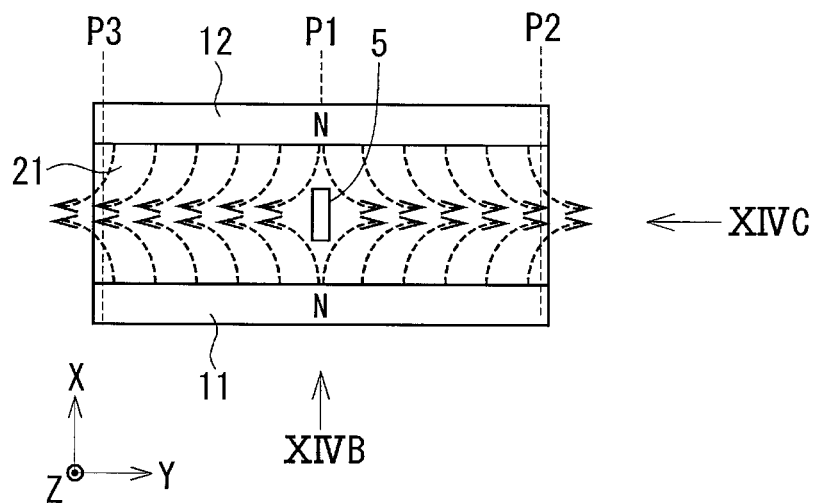
FIG. 14A is a schematic view showing direction of magnetic field of the position detecting device according to the third embodiment.
Figure 14B:
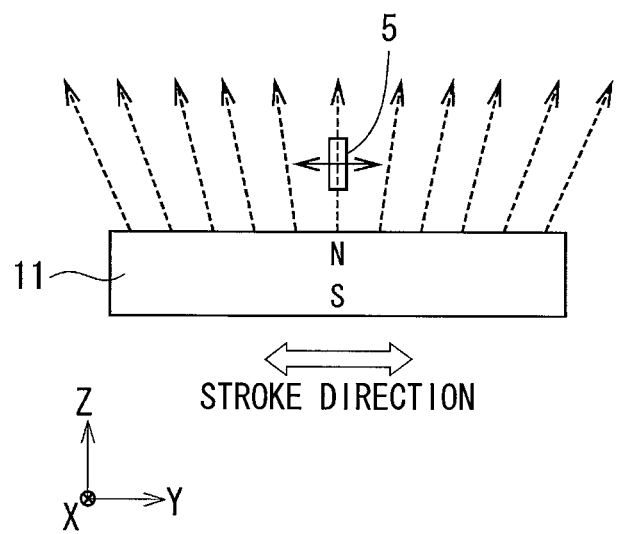
FIG. 14B is a schematic side view in a direction of an arrow XIVB in FIG. 14A
Figure 14C:
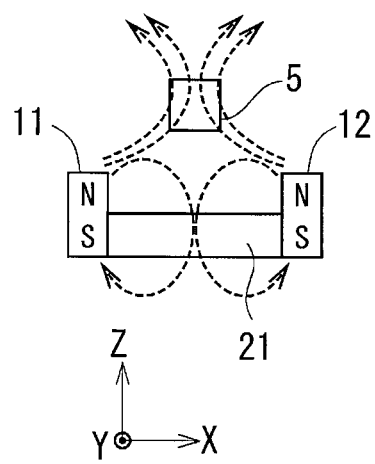
FIG. 14C is a schematic side view in a direction of an arrow XIVC in FIG. 14A.

The hall IC 5 is provided in the Y-parallel area, in which the direction of the magnetic field is in parallel to the Y-axis. FIG. 11 shows an output characteristic for density of the magnetic flux, which is detected by the hall element 51.

As shown in FIGS. 10A, 10B, 10C and 11, the density (T) of the magnetic flux passing through the magnetic sensing surface 511 of the hall element 51 becomes a minimum value at a center position P1 in the direction of the Y-axis of the first and the second magnets 11 and 12. When a magnetic-flux vector in the direction of the Y-axis (that is, a right-hand direction in FIGS. 10A and 10B) is expressed by a positive figure (in a plus (+) side), the density (T) of the magnetic flux becomes larger as the absolute figure in the minus (−) side as the hall element 51 moves to a right-hand position P2 of the first and the second magnets 11 and 12 relative to the movable member 2. On the other hand, the density (T) of the magnetic flux becomes larger in a plus (+) side as the hall element 51 moves to a left-hand position P3 of the first and the second magnets 11 and 12 relative to the movable member 2.

In a case that the magnetic-flux vector in the direction of the Y-axis (the left-hand direction in FIGS. 10A and 10B) is expressed by a negative figure (in the minus (−) side), a gradient for the characteristic curve is reversed in FIG. 11. In other words, the density (T) of the magnetic flux becomes larger in the plus (+) side as the hall element 51 moves to the right-hand position P2 of the first and the second magnets 11 and 12 relative to the movable member 2. On the other hand, the density (T) of the magnetic flux becomes larger as the absolute figure in the minus (−) side as the hall element 51 moves to the left-hand position P3 of the first and the second magnets 11 and 12 relative to the movable member 2.

The same advantages of the first embodiment can be obtained in the second embodiment.

(Third Embodiment)

A third embodiment of the present disclosure is shown in FIGS. 12, 13A to 13C and 14A to 14C. In a position detecting device of the third embodiment, a base plate 21 is provided between the first and the second magnets 11 and 12. The base plate 21 is made of non-magnetic material, such as metal, resin or the like. A pair of through-holes 22 extending in a thickness direction is formed in the base plate 21. A pair of screwed holes (not shown) is formed in the movable member 2 at such positions opposing to the respective through-holes 22 of the base plate 21. A pair of screws 24 is inserted into the respective through-holes 22 and screwed into the screwed holes, so that the base plate 21 is firmly fixed to the movable member 2.

The first magnet 11 is fixed to one of side surfaces of the base plate 21 in the direction of the X-axis, while the second magnet 12 is fixed to the other side surface of the base plate 21 in the direction of the X-axis. In each of the first and the second magnets 11 and 12, the N-pole is formed at the upper side of each magnet, while the S-pole is formed at the lower side thereof, that is, the side in contact with the movable member 2.

According to the third embodiment, the first and the second magnets 11 and 12 can be accurately positioned to the movable member 2 by the base plate 21. In the area (the Y-parallel area), in which the hall IC 5 is provided, the directions of the magnetic fields can be uniformly made to be in parallel to the direction of the Y-axis. As a result, the robustness of the position detecting device 1 can be increased with respect to the position gap between the hall IC 5 and the first and the second magnets 11 and 12.

In the third embodiment, since the base plate 21 is made of non-magnetic material, the magnetic fields of the first and the second magnets 11 and 12 cannot be pulled into the base plate 21. When compared with a case in which the first and the second magnets are fixed to a base plate (a positioning member) made of magnetic material, the magnetic field strength in the area surrounding the hall IC 5 becomes larger in the third embodiment. The robustness of the position detecting device for disturbance is increased, so that the detecting accuracy can be increased.

(Fourth Embodiment)

Figure 15A:
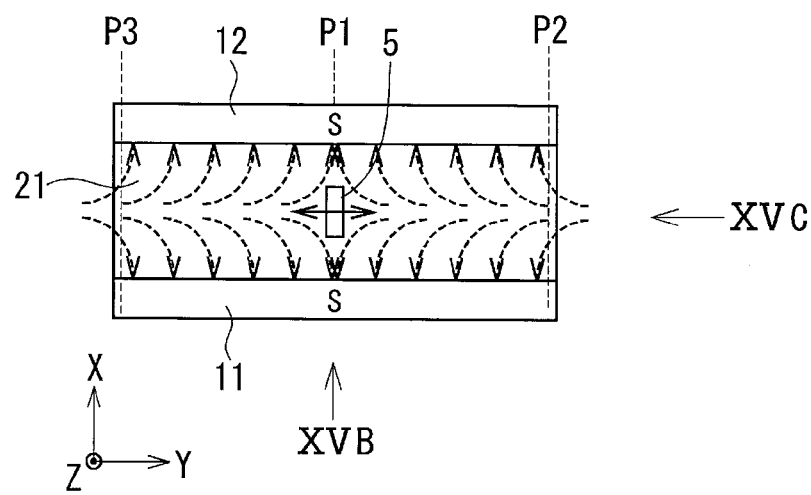
FIG. 15A is a schematic view showing direction of magnetic field of a position detecting device according to a fourth embodiment.
Figure 15B:
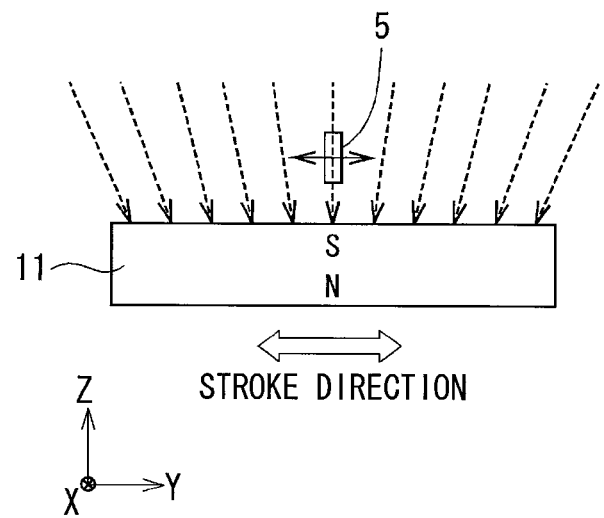
FIG. 15B is a schematic side view in a direction of an arrow XVB in FIG. 15A
Figure 15C:
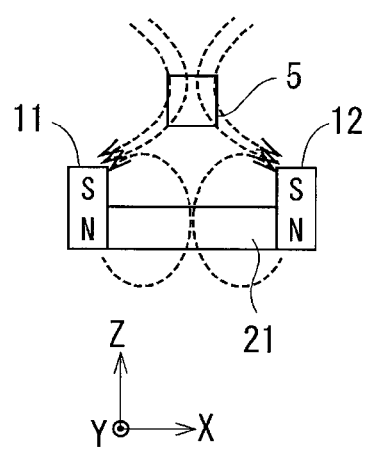
FIG. 15C is a schematic side view in a direction of an arrow XVC in FIG. 15A.

A fourth embodiment of the present disclosure is shown in FIGS. 15A to 15C. The fourth embodiment is a modification of the third embodiment.

In the fourth embodiment, the first and the second magnets 11 and 12 are positioned by the base plate 21, as in the same manner to the third embodiment. In the position detecting device, the S-pole is formed at the upper side of each magnet 11, 12, while the N-pole is formed at the lower side thereof, that is, the side in contact with the movable member 2.

The same advantages to the third embodiment can be obtained in the fourth embodiment.

(Fifth Embodiment)

Figure 16A:
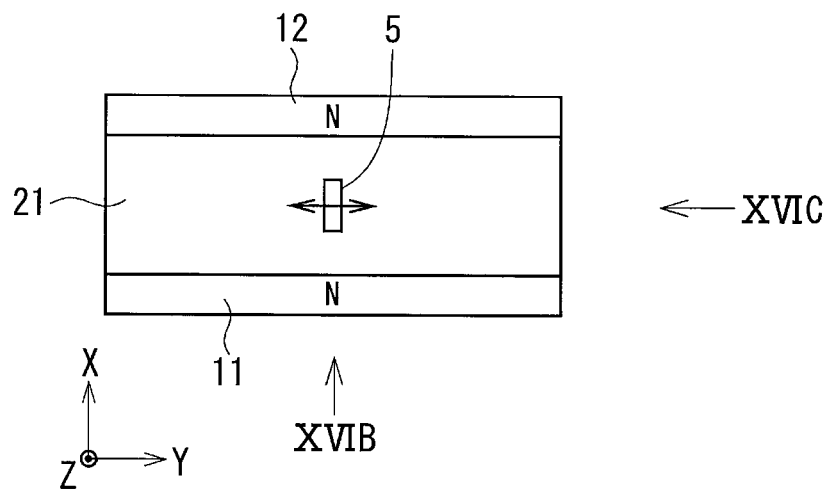
FIG. 16A is a schematic plane view showing a position detecting device according to a fifth embodiment.
Figure 16B:
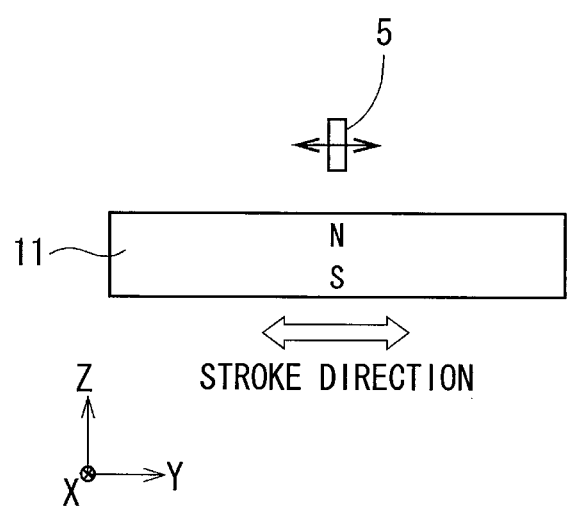
FIG. 16B is a schematic side view in a direction of an arrow XVIB in FIG. 16A
Figure 16C:
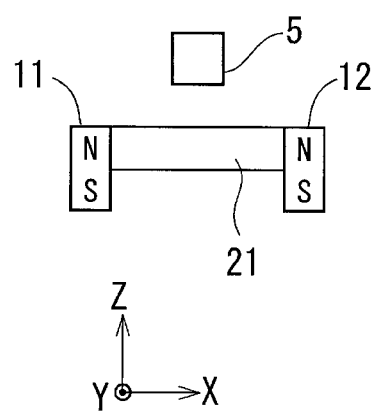
FIG. 16C is a schematic side view in a direction of an arrow XVIC in FIG. 16A.

A fifth embodiment of the present disclosure is shown in FIGS. 16A to 16C. The fifth embodiment is another modification of the third embodiment (FIGS. 12, 13A to 13C and 14A to 14C).

In the fifth embodiment, the base plate 21 made of resin is provided at such a position (as best shown in FIG. 16C), which is remote from the movable member 2. The first and the second magnets 11 and 12 are fixed to (and thereby positioned by) the base plate 21, as in the same manner to the third embodiment.

According to the fifth embodiment, even when concavity and convexity exist on the magnet attachment surface 20, the first and the second magnets 11 and 12 can be accurately positioned to the movable member 2.

(Sixth Embodiment)

Figure 17A:
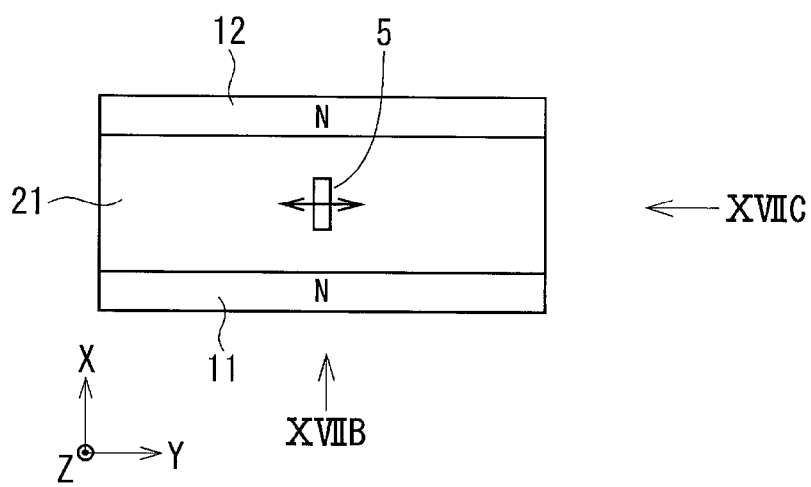
FIG. 17A is a schematic plane view showing a position detecting device according to a sixth embodiment.
Figure 17B:
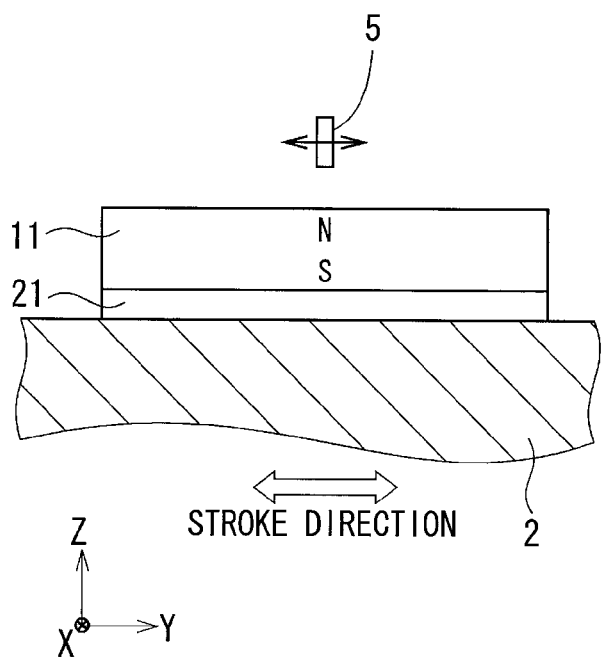
FIG. 17B is a schematic side view in a direction of an arrow XVIIB in FIG. 17A
Figure 17C:
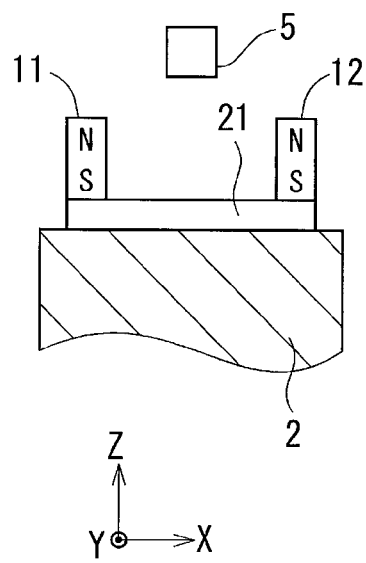
FIG. 17C is a schematic side view in a direction of an arrow XVIIC in FIG. 17A.

A sixth embodiment of the present disclosure is shown in FIGS. 17A to 17C. The sixth embodiment is a further modification of the third embodiment (FIGS. 12, 13A to 13C and 14A to 14C).

In the sixth embodiment, the base plate 21 made of the non-magnetic material (such as, metal, resin or the like) is provided between the first and the second magnets 11 and 12 and the movable member 2. The first and the second magnets 11 and 12 are positioned by the base plate 21 and fixed to the movable member 2.

According to the sixth embodiment, a distance between the first and the second magnets 11 and 12 and the movable member 2 becomes larger, when compared with the third embodiment. In a case a larger space for the position detecting device can be obtained in the direction of the Z-axis, it is possible to surely avoid the situation that the magnetic fields of the magnets 11 and 12 are pulled into the movable member 2. In addition, the magnetic field strength in the area surrounding the hall IC 5 can be increased.

(Seventh Embodiment)

A seventh embodiment of the present disclosure is shown in FIGS. 18A to 18C and 19. The seventh embodiment is a modification of the first embodiment (FIGS. 1 to 7).

In the seventh embodiment, in each of the first and the second magnets 11 and 12, a volume of each longitudinal end 13, 14 of the magnet 11, 12 in the direction of the Y-axis is made larger than that of a center portion 15 of the magnet 11, 12. More in detail, each of the longitudinal ends 13, 14 is made larger than the center portion 15 in the direction of the Z-axis, so that each end 13, 14 is projected from the center portion 15 in the direction opposite to the movable member 2.

Figure 19:
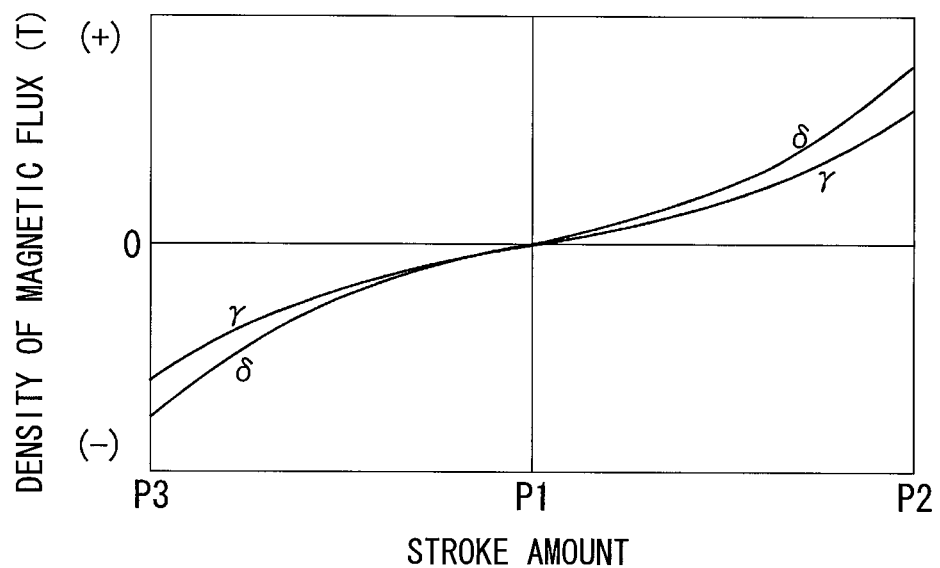
FIG. 19 is a graph showing characteristic curves of density of magnetic flux detected by a hall element according to the seventh embodiment.

When the volume of the longitudinal end 13, 14 is made larger, the magnetic force at such large-volume portion is increased. It is, therefore, possible to compensate an amount of magnetic flux, which may have leaked to an outside from the longitudinal end 13, 14. In FIG. 19, a characteristic curve "γ" shows the density of the magnetic flux of the first embodiment, while a characteristic curve "δ" shows the density of the magnetic flux detected by the hall element 51 of the seventh embodiment. As shown in FIG. 19, sensitivity for the magnetic flux is improved at the both longitudinal ends of the magnets 11, 12.

According to the seventh embodiment, the sensitivity of the output signal of the hall IC 5 can be increased at both ends in the stroke direction (that is, at both ends of a stroke detecting range). The detecting accuracy of the position detecting device can be thereby increased.

(Eighth Embodiment)

Figure 18A:
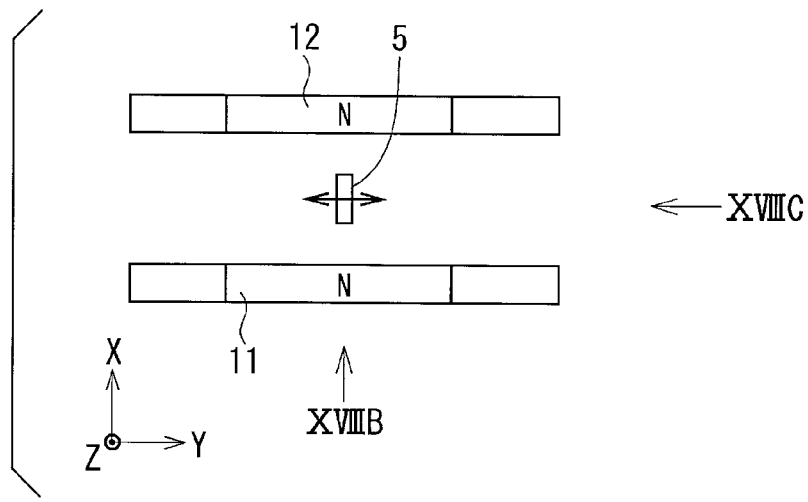
FIG. 18A is a schematic plane view showing a position detecting device according to a seventh embodiment.
Figure 18B:
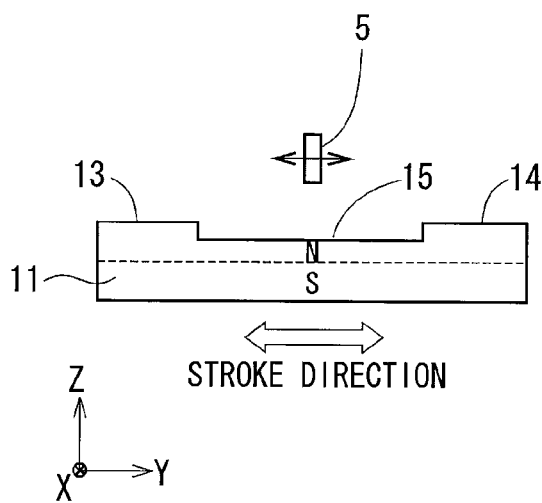
FIG. 18B is a schematic side view in a direction of an arrow XVIIIB in FIG. 18A
Figure 18C:
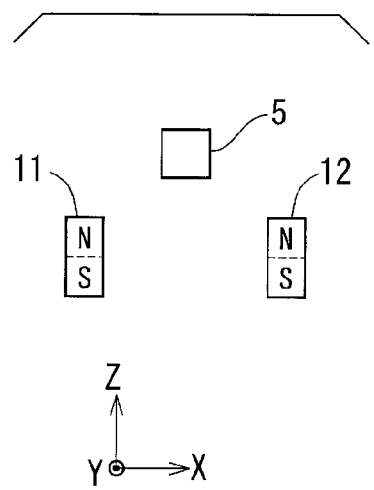
FIG. 18C is a schematic side view in a direction of an arrow XVIIIC in FIG. 18A.
Figure 20A:
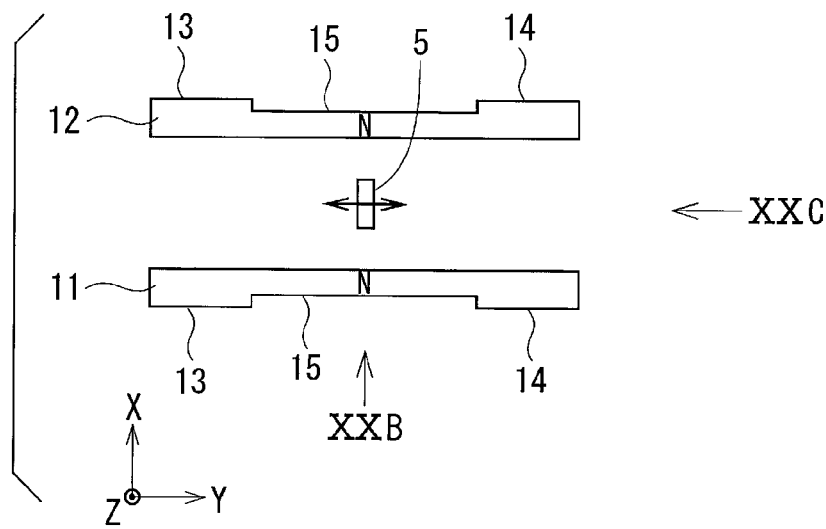
FIG. 20A is a schematic plane view showing a position detecting device according to an eighth embodiment.
Figure 20B:
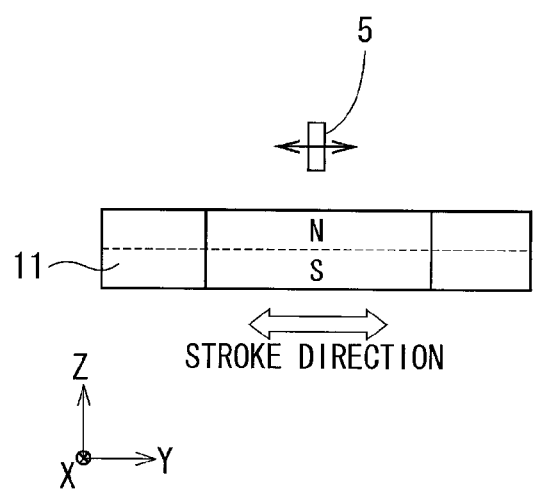
FIG. 20B is a schematic side view in a direction of an arrow XXB in FIG. 20A
Figure 20C:
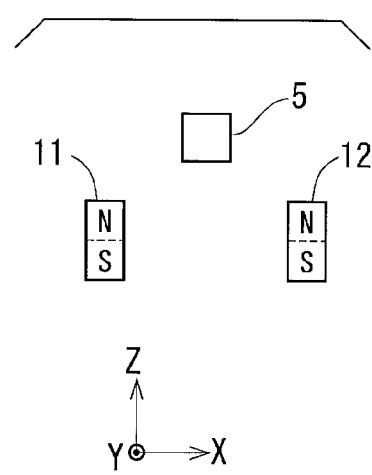
FIG. 20C is a schematic side view in a direction of an arrow XXC in FIG. 20A.

An eighth embodiment of the present disclosure is shown in FIGS. 20A to 20C. The eighth embodiment is a modification of the seventh embodiment (FIGS. 18A to 18C).

In the eighth embodiment, in each of the first and the second magnets 11 and 12, a volume of each longitudinal end 13, 14 of the magnet 11, 12 in the direction of the X-axis is made larger than that of the center portion 15 of the magnet 11, 12. More in detail, each of the longitudinal ends 13, 14 is made larger than the center portion 15 in the direction of the X-axis, so that each end 13, 14 is projected from the center portion 15 in the direction opposite to the hall IC 5.

The same advantages of the seventh embodiment can be obtained in the eighth embodiment. It is possible to combine the structure of the seventh embodiment to the structure of the eighth embodiment, depending on requirements and/or limitations for a physical, size of the position detecting device in the directions of the X-axis and/or the Y-axis.

(Ninth Embodiment)

Figure 21A:
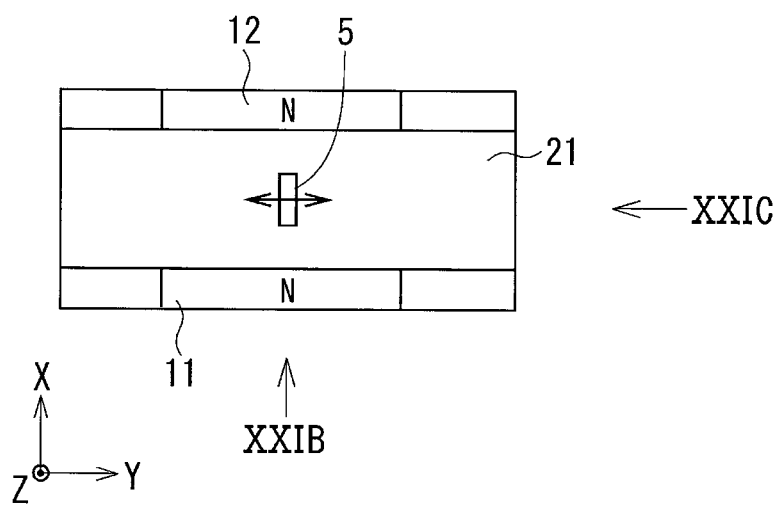
FIG. 21A is a schematic plane view showing a position detecting device according to a ninth embodiment.
Figure 21B:
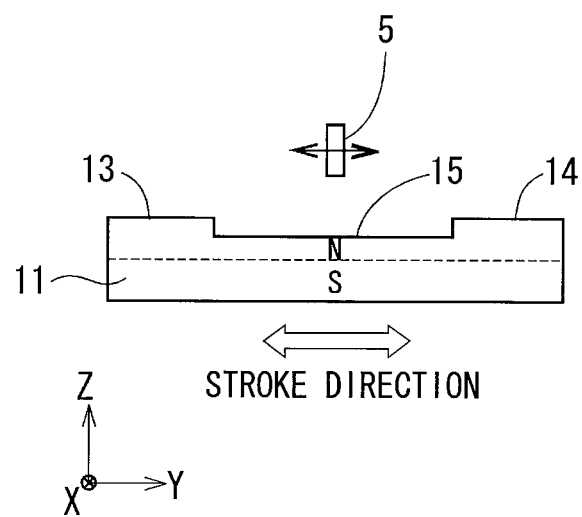
FIG. 21B is a schematic side view in a direction of an arrow XXIB in FIG. 21A
Figure 21C:
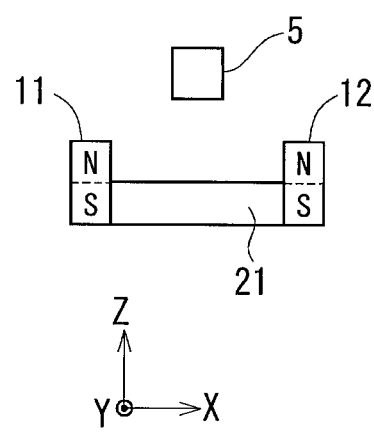
FIG. 21C is a schematic side view in a direction of an arrow XXIC in FIG. 21A.

A ninth embodiment of the present disclosure is shown in FIGS. 21A to 21C. The ninth embodiment is another modification of the seventh embodiment (FIGS. 18A to 18C), wherein the structure of the third embodiment is combined to the seventh embodiment.

In the ninth embodiment, the first and the second magnets 11 and 12 are positioned by the base plate 21 to the movable member 2. In the area (the Y-parallel area), in which the hall IC 5 is provided, the directions of the magnetic fields can be uniformly made to be in parallel to the direction of the Y-axis. As a result, the robustness of the position detecting device 1 can be increased with respect to the position gap between the hall IC 5 and the first and the second magnets 11 and 12. In addition, linearity for the density of the magnetic flux, which is detected by the hall element 51, can be increased.

(Tenth Embodiment)

Figure 22A:
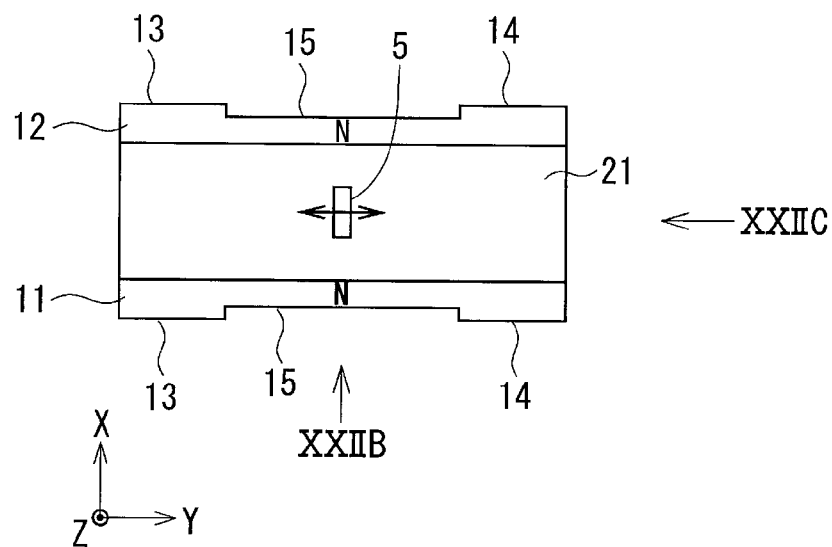
FIG. 22A is a schematic plane view showing a position detecting device according to a tenth embodiment.
Figure 22B:
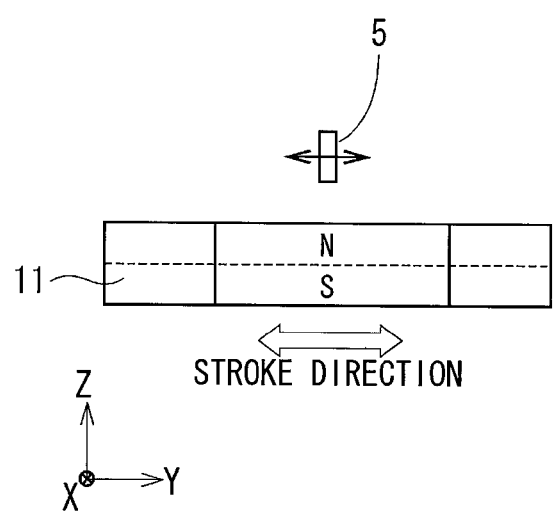
FIG. 22B is a schematic side view in a direction of an arrow XXIIB in FIG. 22A
Figure 22C:
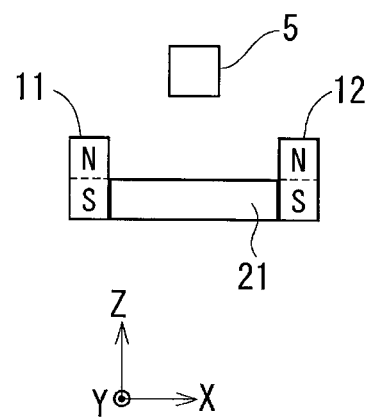
FIG. 22C is a schematic side view in a direction of an arrow XXIIC in FIG. 22A.

A tenth embodiment of the present disclosure is shown in FIGS. 22A to 22C. The tenth embodiment is a modification of the eighth embodiment (FIGS. 20A to 20C), wherein the structure of the third embodiment is combined to the eighth embodiment.

As in the same manner to the ninth embodiment, in the tenth embodiment, the first and the second magnets 11 and 12 are positioned by the base plate 21 to the movable member 2. In the area (the Y-parallel area), in which the hall IC 5 is provided, the directions of the magnetic fields can be uniformly made to be in parallel to the direction of the Y-axis. As a result, the robustness of the position detecting device 1 can be increased with respect to the position gap between the hall IC 5 and the first and the second magnets 11 and 12. In addition, linearity for the density of the magnetic flux, which is detected by the hall element 51, can be increased.

(Eleventh Embodiment)

An eleventh embodiment of the present disclosure is shown in FIGS. 23A to 23C and 24.

Figure 23A:
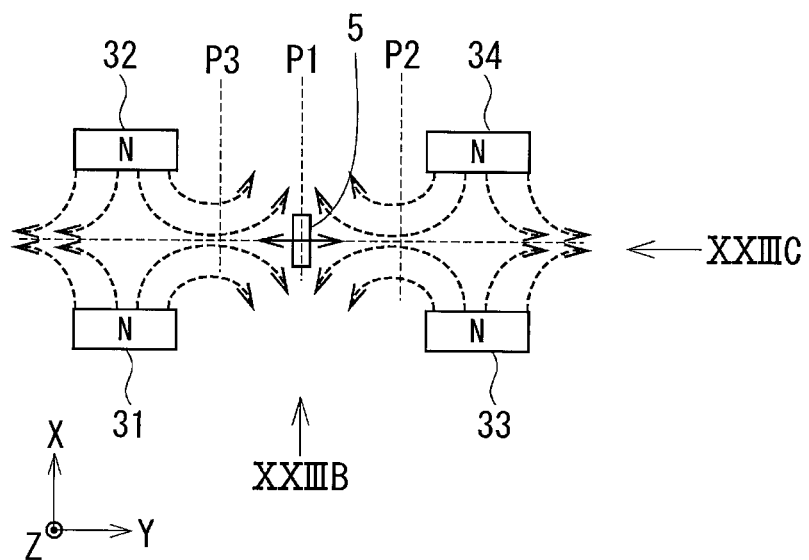
FIG. 23A is a schematic view showing direction of magnetic field of a position detecting device according to an eleventh embodiment.

In the eleventh embodiment, four magnets are provided. A third magnet 33 is provided at such a position distanced from a first magnet 31 in the direction of the Y-axis. As shown in FIG. 23A, the third magnet 33 is located on the same plane to that for the first magnet 31, which is in parallel to the Y-axis and extending in the direction of the Y-axis. In a similar manner, a fourth magnet 34 is provided at such a position distanced from a second magnet 32 in the direction of the Y-axis. Each of the third and fourth magnets 33 and 34 is separated from the respective first and second magnets 31 and 32 at a predetermined distance, which almost corresponds to an amount of stroke of the movable member 2. Each of the first to the fourth magnets 31 to 34 is formed in the same shape of the rectangular parallelepiped and has the same magnetic characteristic to each other. In each of the magnets 31 to 34, the S-pole is formed at the lower side of the magnet in contact with the movable member 2 and N-pole is formed at the upper side opposite to the movable member 2.

The hall IC 5 is located on the virtual plane "α" at such a position equally distanced from the first and second magnets 31 and 32 in the direction of the X-axis and also equally distanced from the third and fourth magnets 33 and 34. The hall IC 5 is movable on the virtual plane "α" relative to the movable member 2.

Directions of the magnetic fields of the first to fourth magnets 31 to 34 will be explained.

Figure 23B:
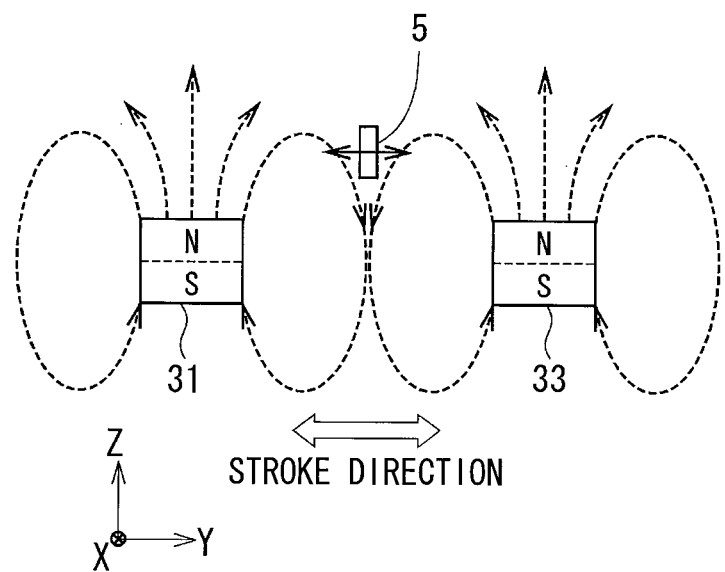
FIG. 23B is a schematic side view in a direction of an arrow XXIIIB in FIG. 23A
Figure 23C:
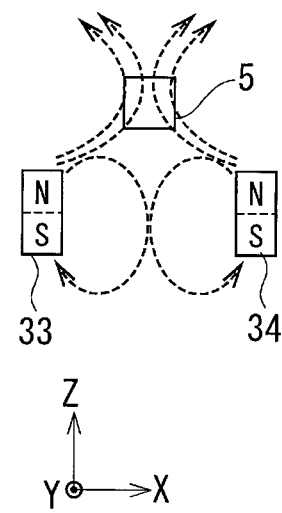
FIG. 23C is a schematic side view in a direction of an arrow XXIIIC in FIG. 23A.

As shown in FIGS. 23A to 23C, the magnetic fields for the N-poles of the respective magnets 31 to 34 rebel against one another. As a result, such an area (a Y-parallel area) is formed in a space more remote from the movable member 2 in the direction of the Z-axis than the first to fourth magnets 31 to 34. In the above area (the Y-parallel area), directions of the magnetic fields are in parallel to the Y-axis, when viewed in the direction of the Z-axis. Since the N-pole of each magnet 31 to 34 is formed at a position remote from the movable member 2 in the direction of the Z-axis, it is suppressed that the magnetic fields from the respective magnets 31 to 34 are pulled into the movable member 2, as shown in FIG. 23C. Instead, magnetic field strength is increased in the above area (the Y-parallel area), which is more remote from the movable member 2 than the first to fourth magnets 31 to 34.

As shown in FIGS. 23A to 23C and 24, the density (T) of the magnetic flux passing through the magnetic sensing surface of the hall element of the hall IC 5 becomes a minimum value at a center position P1 in the direction of the Y-axis between the first and the third magnets 31 and 33 (that is, also a center position in the direction of the Y-axis between the second and the fourth magnets 32 and 34).

When a magnetic-flux vector in the direction of the Y-axis (that is, a right-hand direction in FIGS. 23A and 23B) is expressed by a positive figure (in a plus (+) side), the density (T) of the magnetic flux becomes larger as an absolute figure in a minus (−) side as the hall element of the hall IC 5 moves (relative to the movable member 2) to a right-hand position P2, in the direction toward the third and the fourth magnets 33 and 34. On the other hand, the density (T) of the magnetic flux becomes larger in the minus (+) side as the hall element of the hall IC 5 moves (relative to the movable member 2) to a left-hand position P3, in the direction toward the first and the second magnets 31 and 32.

Figure 24:
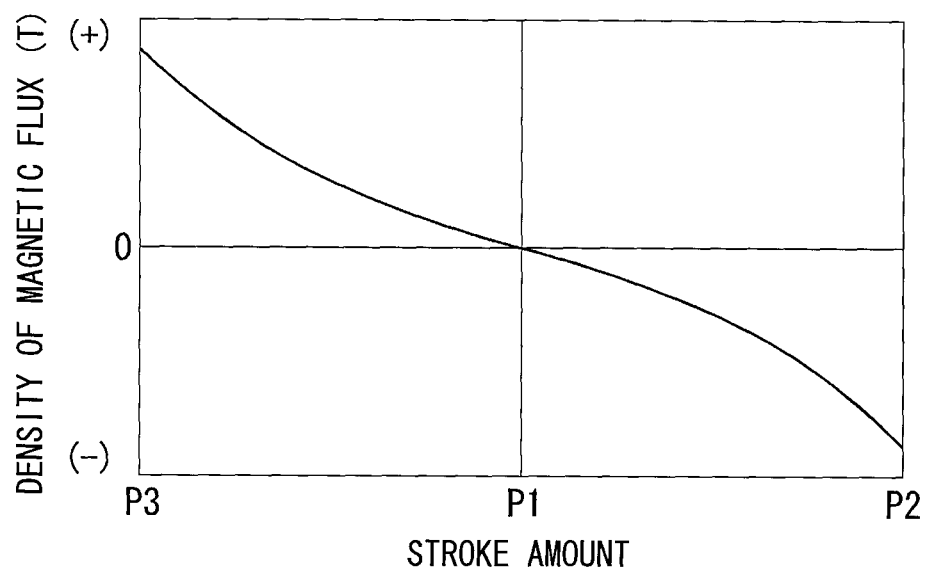
FIG. 24 is a graph showing a characteristic curve of density of magnetic flux detected by a hall element according to the eleventh embodiment.

In a case that the magnetic-flux vector in the direction of the Y-axis (the right-hand direction in FIGS. 23A and 23B) is expressed by a negative figure (in the minus (−) side), a gradient for the characteristic curve is reversed in FIG. 24. In other words, the density (T) of the magnetic flux becomes larger in the plus (+) side as the hall element of the hall IC 5 moves to the right-hand position P2 (toward the third and the fourth magnets 33 and 34). On the other hand, the density (T) of the magnetic flux becomes larger, as the absolute figure, in minus (−) side as the hall element of the hall IC 5 moves to the left-hand position P3 (toward the first and the second magnets 31 and 32).

In the eleventh embodiment, the magnets are arranged at both sides in the stroke direction (that is, at both sides of the stroke detecting range). A total volume of the magnets for the position detecting device can be reduced, when compared with that for the first to the tenth embodiments. A manufacturing cost for the position detecting device can be thereby reduced.

In addition, linearity for the density of the magnetic flux can be further improved, when locations of the respective magnets 31 to 34 are adjusted.

(Twelfth Embodiment)

A twelfth embodiment of the present disclosure is shown in FIG. 25. The twelfth embodiment is a modification of the eleventh embodiment.

In the twelfth embodiment, a base plate 25 made of resin is provided so as to accurately position the first to the fourth magnets 31 to 34 to the movable member 2.

In the area (the Y-parallel area), in which the hall IC 5 is provided, the directions of the magnetic fields can be uniformly made to be in parallel to the direction of the Y-axis. As a result, the robustness of the position detecting device 1 can be increased and the detecting accuracy is correspondingly improved.

(Thirteenth Embodiment)

A thirteenth embodiment of the present disclosure is shown in FIGS. 26A to 26C and 27. The thirteenth embodiment is another modification of the eleventh embodiment and each of the magnets 31 to 34 is magnetized in an opposite direction to that of the eleventh embodiment. Namely, the N-pole of each magnet 31 to 34 is formed at the lower side thereof in contact with the movable member 2, while the S-pole is formed at the upper side of each magnet 31 to 34 opposite to the movable member 2.

Figure 26A:
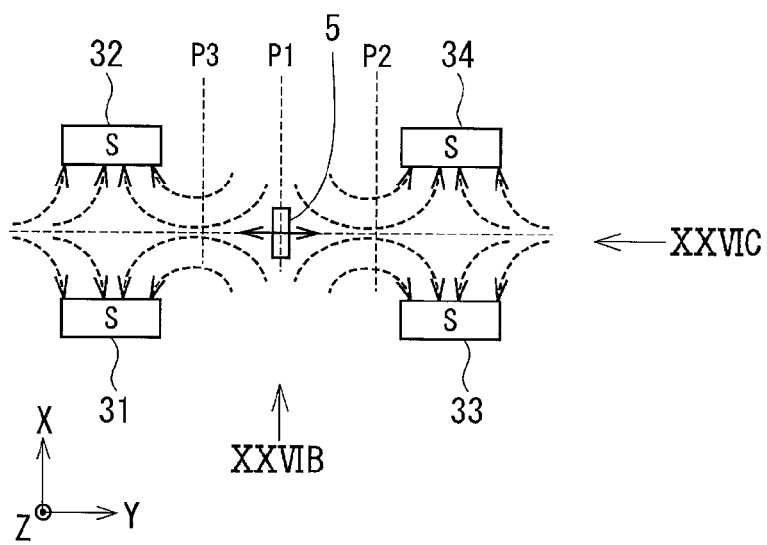
FIG. 26A is a schematic view showing direction of magnetic field of a position detecting device according to a thirteenth embodiment.
Figure 26B:
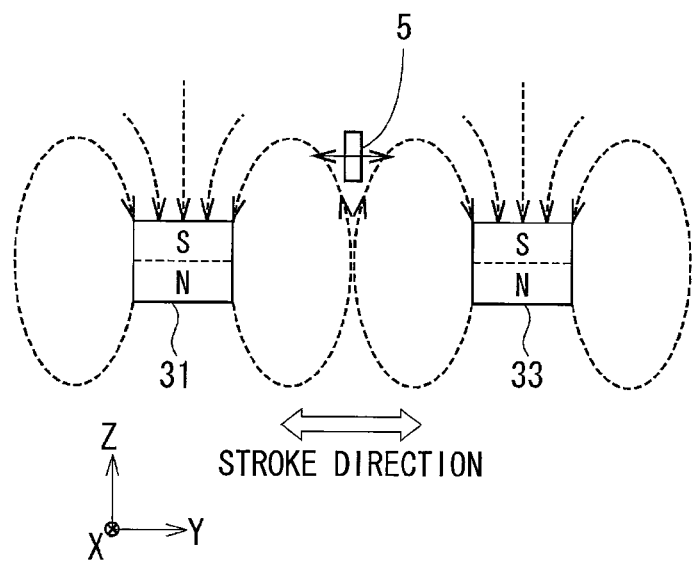
FIG. 26B is a schematic side view in a direction of an arrow XXVIB in FIG. 26A
Figure 26C:
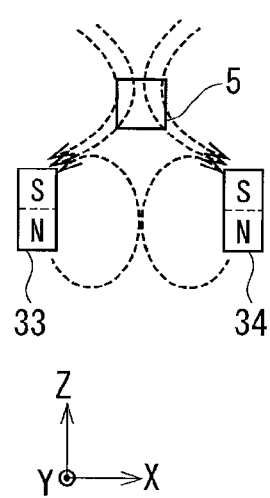
FIG. 26C is a schematic side view in a direction of an arrow XXVIC in FIG. 26A.

As shown in FIGS. 26A to 26C, the magnetic fields for the S-pole of the respective magnets 31 to 34 rebel against one another. As a result, such an area (a Y-parallel area) is formed in a space more remote from the movable member 2 than the first to fourth magnets 31 to 34, in which directions of the magnetic fields are in parallel to the Y-axis, when viewed in the direction of the Z-axis.

Since the S-pole of each magnet 31 to 34 is formed at a position remote from the movable member 2 in the direction of the Z-axis, it is suppressed that the magnetic fields from the respective magnets 31 to 34 are pulled into the movable member 2, as shown in FIG. 26C. Instead, magnetic field strength is increased in the above area (the Y-parallel area), which is more remote from the movable member 2 than the first to fourth magnets 31 to 34.

As shown in FIGS. 26A to 26C and 27, the density (T) of the magnetic flux passing through the magnetic sensing surface of the hall element of the hall IC 5 becomes a minimum value at a center position P1 in the direction of the Y-axis between the first and the third magnets 31 and 33 (that is, also a center position between the second and the fourth magnets 32 and 34).

When a magnetic-flux vector in the direction of the Y-axis (that is, a right-hand direction in FIGS. 26A and 26B) is expressed by a positive figure (in a plus (+) side), the density (T) of the magnetic flux becomes larger in the plus (+) side as the hall element of the hall IC 5 moves (relative to the movable member 2) to a right-hand position P2 on a side of the third and the fourth magnets 33 and 34. On the other hand, the density (T) of the magnetic flux becomes larger as an absolute figure in a minus (−) side as the hall element of the hall IC 5 moves (relative to the movable member 2) to a left-hand position P3 on a side of the first and the second magnets 31 and 32.

Figure 27:
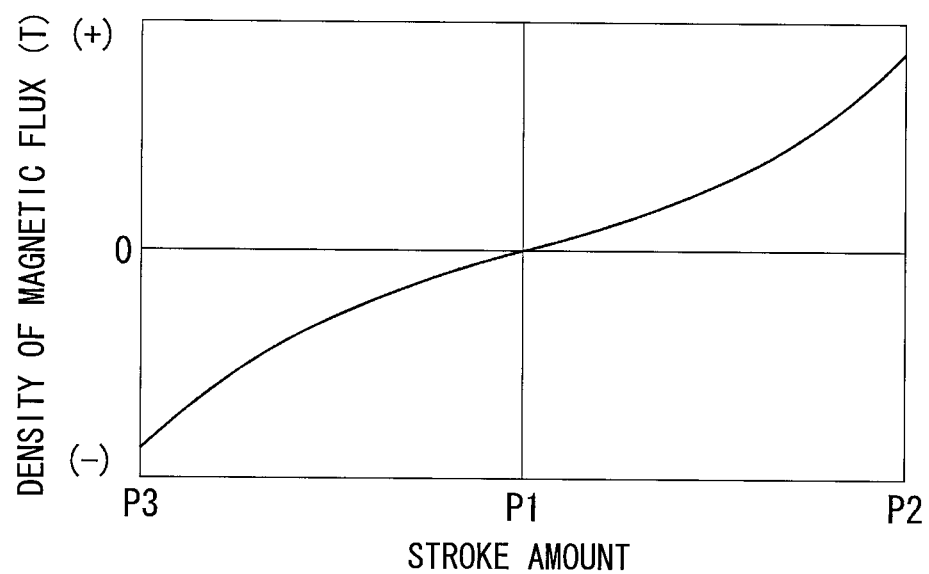
FIG. 27 is a graph showing a characteristic curve of density of magnetic flux detected by a hall element according to the thirteenth embodiment.

In a case that the magnetic-flux vector in the direction of the Y-axis (the right-hand direction in FIGS. 26A and 26B) is expressed by a negative figure (in the minus (−) side), a gradient for the characteristic curve is reversed in FIG. 27. In other words, the density (T) of the magnetic flux becomes larger, as the absolute figure, in the minus (−) side as the hall element of the hall IC 5 moves to the right-hand position P2 on the side of the third and the fourth magnets 33 and 34. On the other hand, the density (T) of the magnetic flux becomes larger in plus (+) side as the hall element of the hall IC 5 moves to the left-hand position P3 on the side of the first and the second magnets 31 and 32.

As above, the same advantages to the eleventh embodiment can be also obtained in the thirteenth embodiment.

(Fourteenth Embodiment)

Figure 25A:
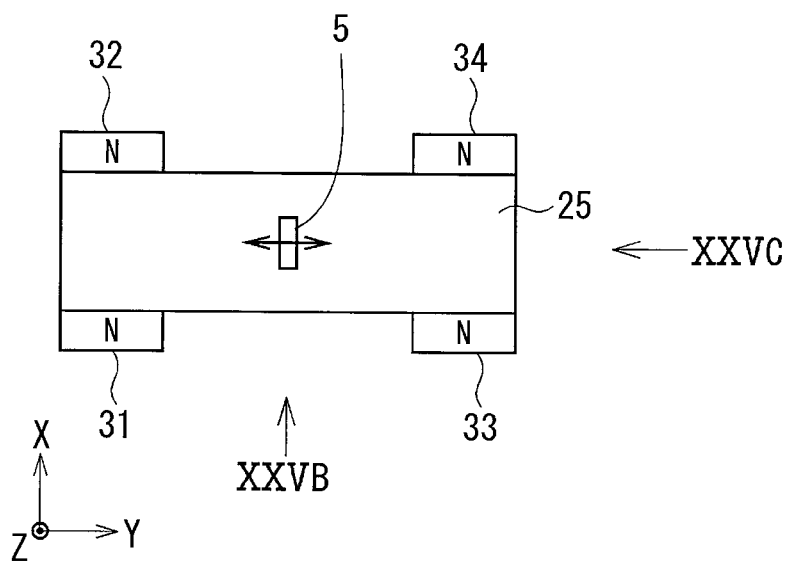
FIG. 25A is a schematic plane view showing a position detecting device according to a twelfth embodiment.
Figure 25B:
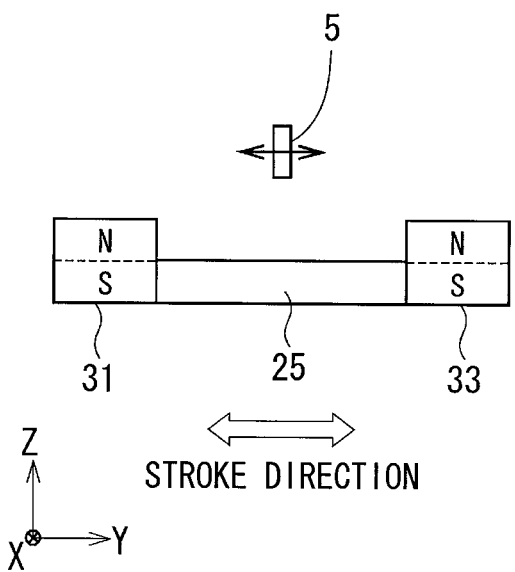
FIG. 25B is a schematic side view in a direction of an arrow XXVB in FIG. 25A
Figure 25C:
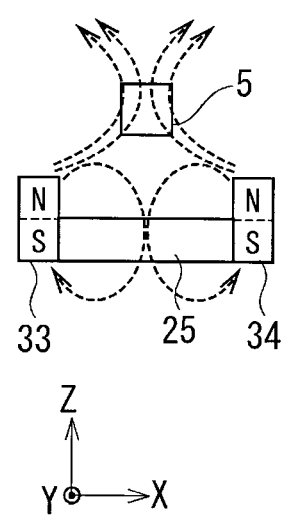
FIG. 25C is a schematic side view in a direction of an arrow XXVC in FIG. 25A.
Figure 28A:
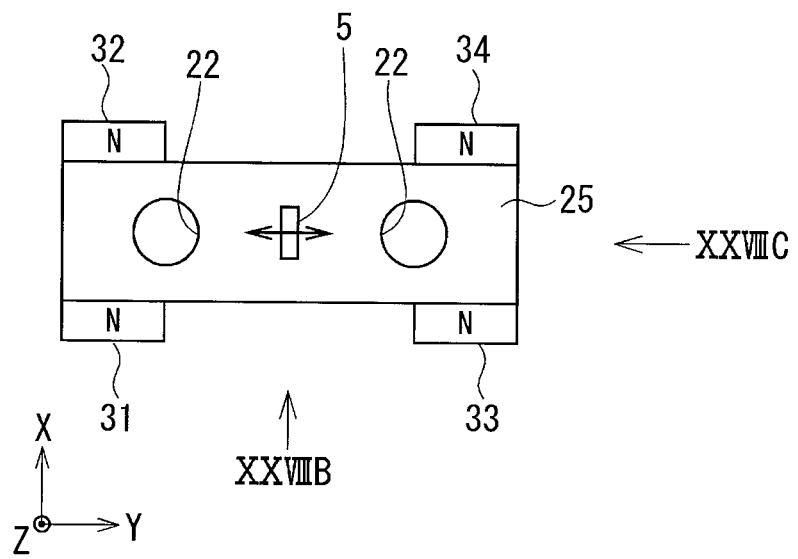
FIG. 28A is a schematic plane view showing a position detecting device according to a fourteenth embodiment.
Figure 28B:
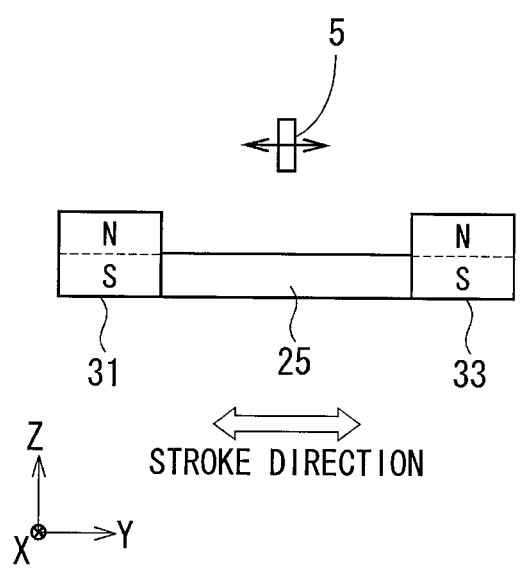
FIG. 28B is a schematic side view in a direction of an arrow XXVIIIB in FIG. 28A
Figure 28C:
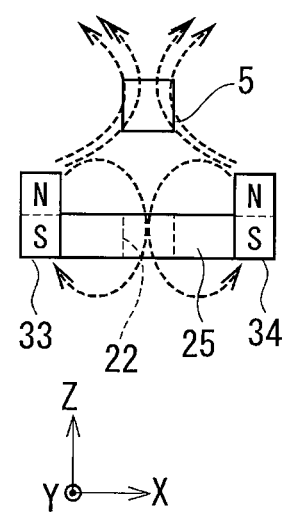
FIG. 28C is a schematic side view in a direction of an arrow XXVIIIC in FIG. 28A.
Figure 29A:
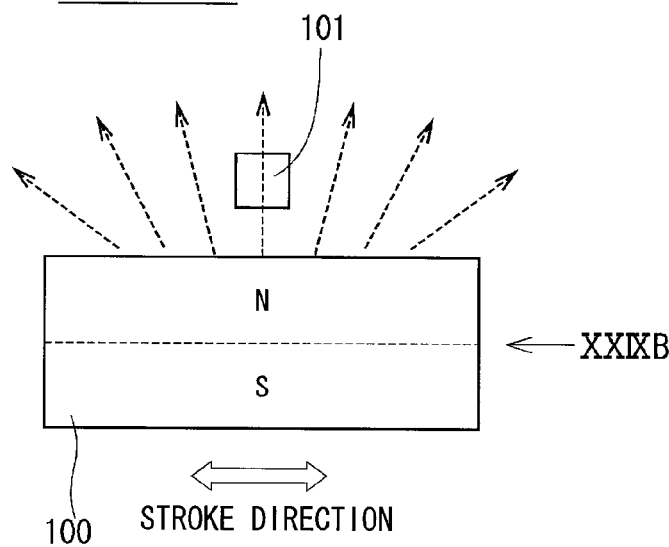
FIG. 29A is a schematic view showing direction of magnetic field of a position detecting device of a prior art (JP 2007-132710) and FIG. 29B is a schematic side view in a direction of an arrow XXIXB in FIG. 29A.
Figure 29B:
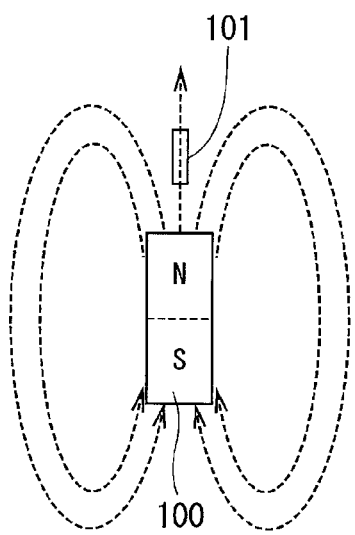

A fourteenth embodiment of the present disclosure is shown in FIGS. 28A to 28C. The fourteenth embodiment is a modification of the twelfth embodiment (FIGS. 25A to 25C).

The four magnets 31 to 34 are positioned by a base plate 25 (which is made of non-magnetic material, such as metal, resin or the like) to the movable member 2. A pair of through-holes 22 extending in a thickness direction is formed in the base plate 25. A pair of screwed holes (not shown) is formed in the movable member 2 at such positions opposing to the respective through-holes 22 of the base plate 25. A pair of screws (not shown) is inserted into the respective through-holes 22 and screwed into the screwed holes, so that the base plate 25 is firmly fixed to the movable member 2. Accordingly, the magnets 31 to 34 are accurately positioned to the movable member 2. In the area (the Y-parallel area), in which the hall IC 5 is provided, the directions of the magnetic fields can be uniformly made to be in parallel to the direction of the Y-axis. As a result, the robustness of the position detecting device 1 can be increased and the detecting accuracy is correspondingly improved.

(Further Embodiments)

In the above embodiments, each of the magnetic-flux generating members is composed of a magnet, which is formed by a single body and formed in the rectangular parallelepiped shape. The magnetic-flux generating member may be formed of a magnet, which is a collective body of multiple magnetic pieces. The shape of the magnet should not be limited to the rectangular parallelepiped shape.

In the above embodiments, the magnetic detecting member is composed of the hall IC. The magnetic detecting member may be composed of such an element having magneto-resistive effect.

The present disclosure should not be limited to the above embodiments. The present disclosure can be modified in various manners, including combinations of the above embodiments, without departing from the spirit of the present disclosure.

What is claimed is:

1. A position detecting device for detecting a position of a movable member movable in a linear stroke direction comprising:

a first magnetic-flux generating member and a second magnetic-flux generating member, the first and the second magnetic-flux generating members being provided on the movable member so as to oppose to each other across a virtual plane which is in parallel to the linear stroke direction and perpendicular to the movable member, the first and the second magnetic-flux generating members being arranged with respect to each other in a first direction which is perpendicular to the linear stroke direction, the first and the second magnetic-flux generating members being magnetized in a second direction which is perpendicular to both of the linear stroke direction and the first direction, and a magnetizing direction of the first magnetic-flux generating member being the same to that of the second magnetic-flux generating member; and a magnetic detecting member provided at a position more remote from the movable member than the first and the second magnetic-flux generating members in the second direction, so as to be movable relative to the movable member in the linear stroke direction, wherein the magnetic detecting member has a magnetic sensing surface arranged so as to be perpendicular to the linear stroke direction, and the magnetic detecting member outputs a signal depending on density of magnetic flux passing through the magnetic sensing surface.

2. The position detecting device according to claim 1, wherein the magnetic detecting member is movable relative to the movable member on the virtual plane, which is equally distanced from the first and the second magnetic-flux generating members.

3. The position detecting device according to claim 1, wherein each of the first and the second magnetic-flux generating members is formed in the same rectangular parallelepiped shape to each other, and each of the first and the second magnetic-flux generating members has the same magnetic characteristic to each other.

4. The position detecting device according to claim 1, wherein a volume of each longitudinal end of the magnetic-flux generating members is made to be larger than that of a center portion of the respective magnetic-flux generating members.

5. The position detecting device according to claim 1, further comprising:

a base plate provided on the movable member for positioning the first and the second magnetic-flux generating members to the movable member.

6. The position detecting device according to claim 5, wherein the base plate is made of non-magnetic material.

7. The position detecting device according to claim 5, wherein the base plate has a through-hole extending in a thickness direction of the base plate.

8. The position detecting device according to claim 1, further comprising:

a linear-correction portion for correcting density of magnetic flux, which is detected by the magnetic detecting member, in such a way that the density of the magnetic flux linearly varies with respect to a stroke amount of the movable member.

9. The position detecting device according to claim 8, wherein the magnetic detecting member and the linear-correction portion are formed in a semiconductor chip.

10. The position detecting device according to claim 1, wherein the magnetic detecting member is composed of a hall element.

11. A position detecting device for detecting a position of a movable member movable in a linear stroke direction comprising:

a first magnetic-flux generating member and a second magnetic-flux generating member, the first and the second magnetic-flux generating members being provided on the movable member so as to oppose to each other across a virtual plane which is in parallel to the linear stroke direction and perpendicular to the movable member, the first and the second magnetic-flux generating members being arranged with respect to each other in a first direction which is perpendicular to the linear stroke direction, the first and the second magnetic-flux generating members being magnetized in a second direction which is perpendicular to both of the linear stroke direction and the first direction, and a magnetizing direction of the first magnetic-flux generating member being the same to that of the second magnetic-flux generating member;

a third magnetic-flux generating member provided at a position remote from the first magnetic-flux generating member by a predetermined distance in the stroke direction and a fourth magnetic-flux generating member provided at another position remote from the second magnetic-flux generating member by a predetermined distance in the stroke direction, the third and the fourth magnetic-flux generating members being magnetized in the second direction, and a magnetizing direction of the third magnetic-flux generating member being the same to that of the fourth magnetic-flux generating member; and a magnetic detecting member provided at a position more remote from the movable member than the first to the fourth magnetic-flux generating members in the second direction, so as to be movable relative to the movable member in the linear stroke direction, wherein the magnetic detecting member has a magnetic sensing surface arranged so as to be perpendicular to the linear stroke direction, and the magnetic detecting member outputs a signal depending on density of magnetic flux passing through the magnetic sensing surface.

12. The position detecting device according to claim 11, wherein the magnetic detecting member is movable relative to the movable member on the virtual plane, which is equally distanced from the first to the fourth magnetic-flux generating members.

13. The position detecting device according to claim 11, wherein each of the first to the fourth magnetic-flux generating members is formed in the same rectangular parallelepiped shape to one another, and each of the first to the fourth magnetic-flux generating members has the same magnetic characteristic to one another.

14. The position detecting device according to claim 1, further comprising:

a base plate provided on the movable member for positioning the first to the fourth magnetic-flux generating members to the movable member.

15. The position detecting device according to claim 14, wherein the base plate is made of non-magnetic material.

16. The position detecting device according to claim 14, wherein the base plate has a through-hole extending in a thickness direction of the base plate.

17. The position detecting device according to claim 11, further comprising:

a linear-correction portion for correcting density of magnetic flux, which is detected by the magnetic detecting member, in such a way that the density of the magnetic flux linearly varies with respect to a stroke amount of the movable member.

18. The position detecting device according to claim 17, wherein the magnetic detecting member and the linear-correction portion are formed in a semiconductor chip.

19. The position detecting device according to claim 11, wherein the magnetic detecting member is composed of a hall element.

\* \* \* \* \*